United States Patent [19]
Ying et al.

[11] Patent Number: 6,147,967
[45] Date of Patent: Nov. 14, 2000

[54] FAULT ISOLATION AND RECOVERY IN A DISTRIBUTED CONTROL NETWORK

[75] Inventors: Jeffrey Ying, Glendora; Michael Kuang, Diamond Bar, both of Calif.

[73] Assignee: I/O Control Corporation, Azusa, Calif.

[21] Appl. No.: 08/853,893

[22] Filed: May 9, 1997

[51] Int. Cl.[7] .................................................. G01R 31/08
[52] U.S. Cl. ........................ 370/222; 370/223; 370/224
[58] Field of Search ................................... 370/216, 221,
370/222, 223, 224, 242, 245, 249, 226;
361/95

[56] References Cited

U.S. PATENT DOCUMENTS

| | | | |
|---|---|---|---|
| Re. 31,852 | 3/1985 | Soderblom | 370/86 |
| 3,890,471 | 6/1975 | Hachenburg . | |
| 4,435,704 | 3/1984 | Hashimoto et al. | 370/223 |
| 4,527,270 | 7/1985 | Sweeton | 370/224 |
| 4,812,943 | 3/1989 | Jones et al. | 361/95 |
| 4,973,953 | 11/1990 | Shimokawa et al. | 370/223 |
| 5,117,430 | 5/1992 | Berglund | 340/825.02 |
| 5,751,220 | 5/1998 | Ghaffari . | |
| 5,802,043 | 9/1998 | Skillen et al. | 370/258 |
| 5,809,220 | 9/1998 | Morrison et al. | 395/185.08 |

*Primary Examiner*—Michael Horabik
*Assistant Examiner*—Prenell Jones
*Attorney, Agent, or Firm*—Lyon & Lyon LLP

[57] ABSTRACT

A control network has a bus to which is connected a master node and a plurality of slave nodes in a loop configuration. Each of the master node and slave nodes has a transceiver connected to the bus through a shunt circuit. The shunt circuit comprises a switch (such as a relay) in parallel circuit configuration with an impedance element (such as resistor). The switch is operated under control of the node and under normal conditions remains closed, thereby allowing signals to be carried freely over the bus. When a fault occurs, each of the nodes opens its switch, causing the separate portions of the bus to become isolated. The master node then instructs each slave node, starting with the closest slave node, to close its switch. When a slave node fails to respond, the fault location has been detected. The master node repeats the process for the opposite direction of the loop. Operation then continues, with the slave node nearest the fault remaining isolated. If the short circuit occurs at the master node, one of the slave nodes may take over for the master node after a predetermined wait period.

34 Claims, 25 Drawing Sheets

CNC
8 I/O — 109
24/12V

```
         (WIRE #516)
 1  —  R/DOOR OV'HD LT
 2  —  R/DOOR AUTHO LT
 3  —  R/DOOR MAGNETIC VALVE
 4  —  REAR RIGHT INTERIOR LTS.
 5  —
 6  —
 7  —  HARKER LT (12V)
 8  —  R/DOOR SKIRT LT (12V)
 9
10
11
12
13
14
15
16      (WIRE #233)
17  —  R/DOOR L-H LIMIT SW. N.O.
18  —  R/DOOR TOUCH BAR TAPE TREADLE SW.
19  —  R/DOOR SENSITIVE EDGE SW.
20  —  R/DOOR PULL CORD SW.
21
22
23
24
```

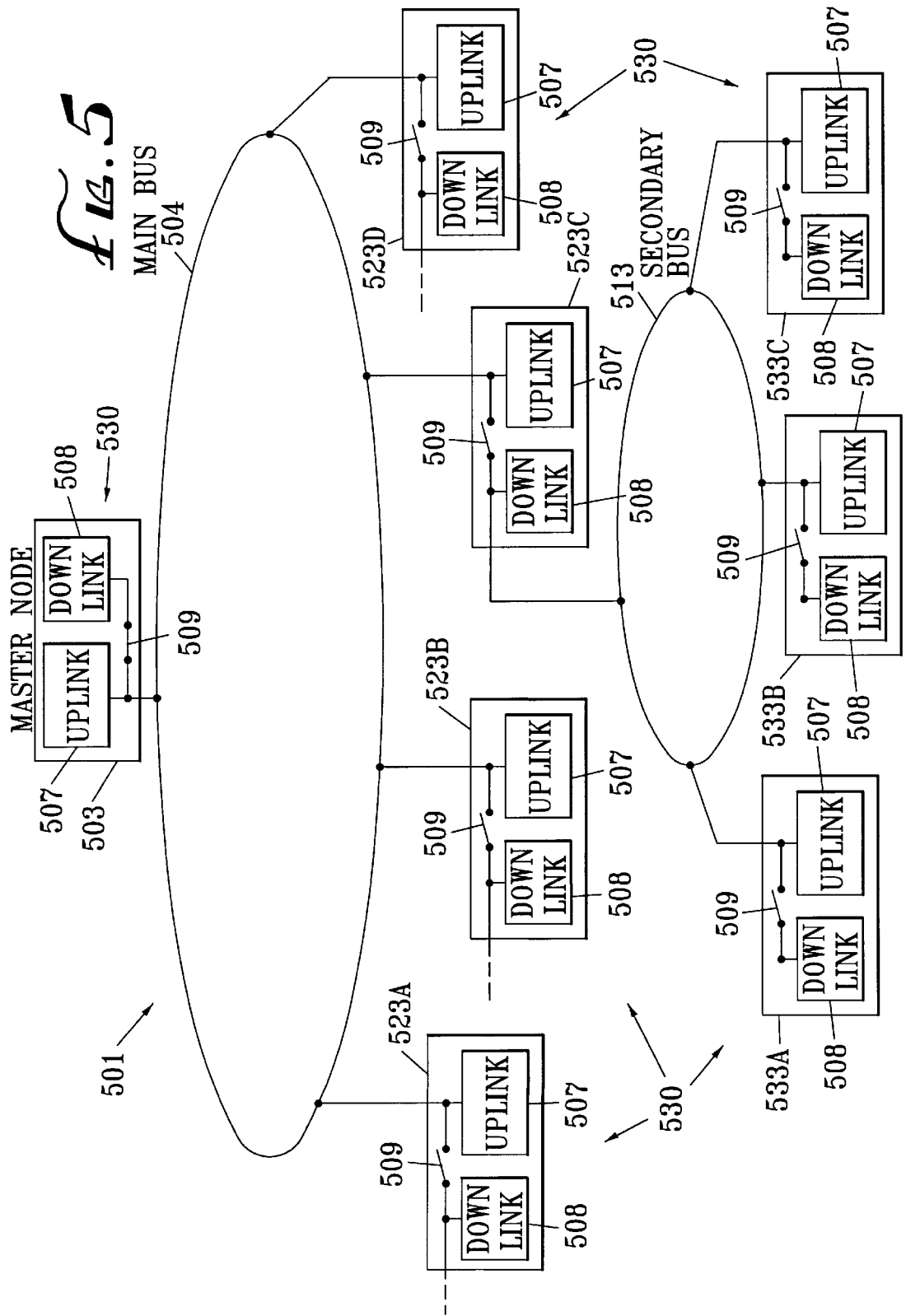

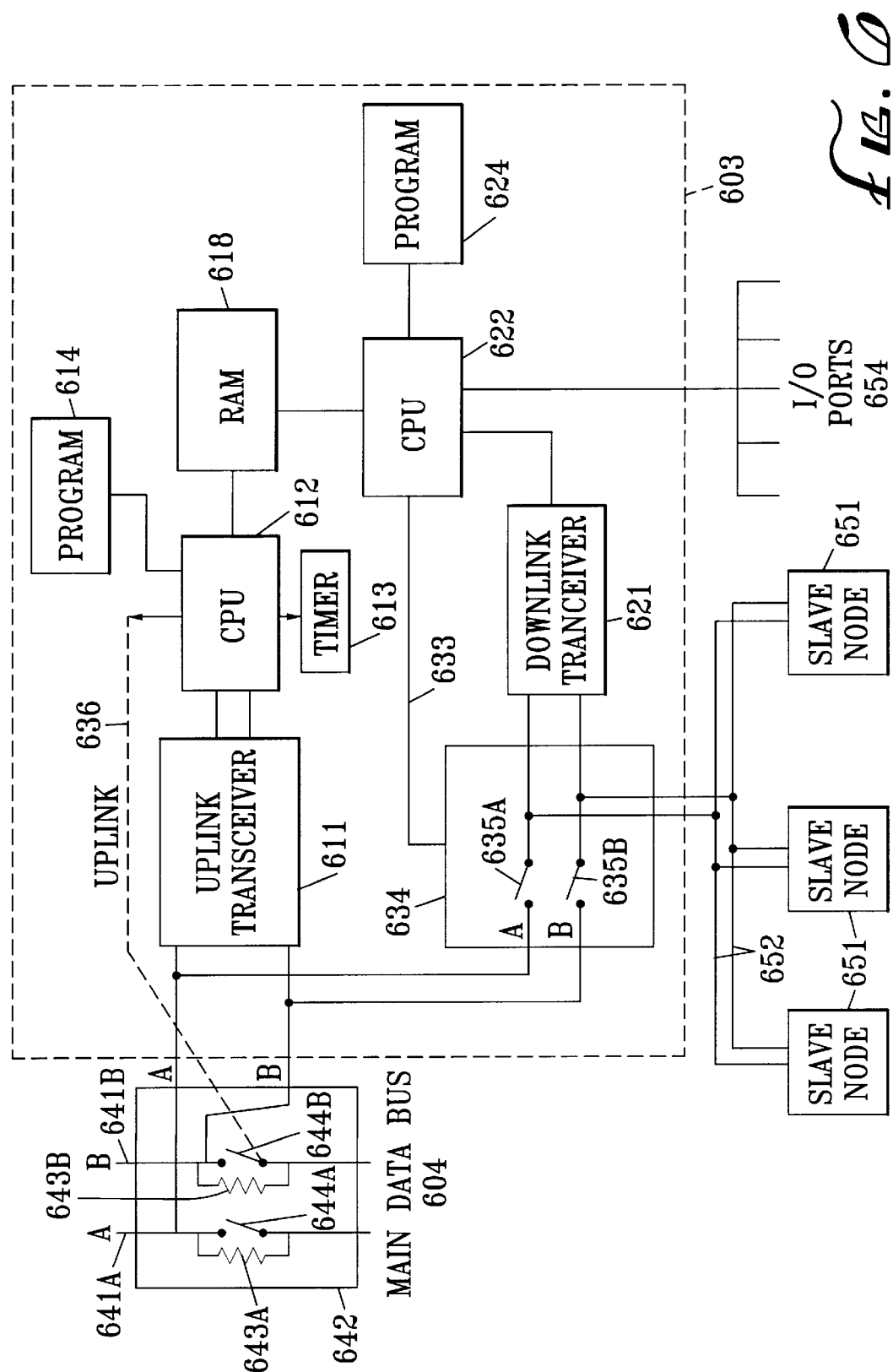

6,147,967

FAULT ISOLATION AND RECOVERY IN A DISTRIBUTED CONTROL NETWORK

BACKGROUND OF THE INVENTION

1) Field of the Invention

The field of the invention pertains to methods and apparatus for fault isolation and recovery and backup control in a distributed control network, such as may be used to control functions in a vehicle or automated manufacturing facility.

2) Background

Automated control systems are commonly used in a number of manufacturing, transportation, and other applications, and are particularly useful to control machinery, sensors, electronics, and other system components. For example, manufacturing or vehicular systems may be outfitted with a variety of sensors and automated electrical and/or mechanical parts that require enablement or activation when needed to perform their predefined functions. Such systems commonly require that functions or procedures be carried out in a prescribed order or with a level of responsiveness that precludes sole reliance on manual control. Also, such systems may employ sensors or other components that require continuous or periodic monitoring and therefore lend themselves to automated control.

As the tasks performed by machinery have grown in number and complexity, a need has arisen for ways to exercise control over the various components of a system rapidly, efficiently and reliably. The sheer number of system components to be monitored, enabled, disabled, activated, deactivated, adjusted or otherwise controlled can lead to difficulties in designing and implementing a suitable control system. As the number of system components to be controlled is increased, not only is the operation of the control system made more complicated, but also the wiring and inter-connections of the control system are likewise more elaborate. In addition, greater reliance on automated control has resulted in larger potential consequences if the automated control system fails.

Traditionally, control systems in certain applications, such as transit vehicles and railcars, have relied upon relay-based control technology. In such systems, relays and switches are slaved to a logic circuit that serves to switch signal connections. This approach requires a large number of relays and a substantial amount of wiring throughout the vehicle. In some instances distributed processors or logic circuits may be used for subsystems such as the door, but these processors or logic circuits often take up significant space and can be costly to maintain.

A substantial improvement has recently been made in the field of control systems. An improved network control system recently developed uses a dual-bus architecture along with distributed controllers. In this improved network control system, a primary bus forms a high-speed, bidirectional communication link interconnecting a main data bus controller with distributed slave modules, one of which acts as a second data bus controller connected to a secondary, low-speed data bus. The slave modules are generally connected to various input/output ports. The second data bus controller can be connected to second-tier slave modules over the secondary, low-speed data bus. The main data bus controller, secondary data bus controller, first-tier slave modules, second-tier slave modules, input/output ports and other system components collectively form a hierarchical system wherein the main data bus controller supervises the first-tier slave modules, including the second data bus controller, the second data bus controller supervises the second-tier slave modules, and the first-tier slave modules and second-tier slave modules supervise their assigned input/output functions.

While the dual-bus control network as described above has many advantages, there are also ways in which it could be improved further. The dual-bus control network architecture as currently known in the art generally relies on a single top-level main data bus controller. If the main data bus controller fails, system performance will be adversely impacted. Also, the possibility of a short circuit occurring, particularly over a region of the bus, is a constant danger. In addition to disrupting communication signals among the components accessing the bus, a short circuit can be difficult to trace and cause substantial disruption of system service while maintenance personnel attempt to locate the short circuit. Furthermore, while the dual-bus network control architecture reduces wiring needed in a vehicle or other automated system, simplification of wiring connections would lead to greater ease of implementation and maintenance.

Accordingly, it would be advantageous to provide a network control system that has a means for recovering from a failure in a main data bus controller or otherwise mitigating the effects such a failure. It would further be advantageous to provide a network control system that reduces the impact of a short circuit and enables rapid identification of the location of a short circuit by maintenance personnel. It would further be advantageous to provide a distributed network control system with simplified wiring and connections.

SUMMARY OF THE INVENTION

The invention provides in one aspect an automatic redundant backup master control for a master control node in a distributed, intelligent control network.

In one aspect of the invention, a master node and a plurality of slave nodes are connected to a common bus in a loop configuration. The master node and slave nodes each have a transceiver connected to the bus through a shunt circuit. The shunt circuit preferably comprises a switch (such as a relay) in parallel circuit configuration with an impedance element (such as resistor). The switch is operated under control of the node and under normal conditions remains closed, thereby allowing signals to be carried freely over the bus. When a fault occurs, each of the nodes opens its switch, causing the separate portions of the bus to become isolated. The master node then instructs each slave node, starting with the closest slave node, to close its switch. When a slave node fails to respond, the fault location has been detected. The master node repeats the process for the opposite direction of the loop. Operation then continues, with the slave node nearest the fault remaining isolated.

If the short circuit occurs at the master node, one of the slave nodes may take over for the master node after a predetermined wait period. In a preferred embodiment of the invention, a master node serves as a controller for a multiplicity of slave nodes. The master node polls the slave nodes periodically. Each of the slave nodes comprises a failure mode detector whereby, if a slave node fails to receive a message from the master node within a certain fixed period of time, then the slave node takes over control for the master node.

In another aspect of the invention, prioritized redundant backup control for the master node is provided by establishing an order in which the slave nodes take over the master node, or substitute master node, in the case of multiple node failures. Preferably, each slave node is programmed to detect a failure mode condition after a different amount of time than the other slave nodes are programmed with. When the first slave node programmed with the shortest failure mode detection time detects a failure mode condition, it takes over for the master node and becomes the substitute master node. Should the substitute master node also fail, then the slave node programmed with the next shortest failure mode detection time will detect a failure mode condition and take over for the substitute master node, becoming the second substitute master node. Likewise, in turn each slave node has the capability of becoming the master node when its programmed failure mode detection time elapses. In this manner, prioritized redundant backup control is achieved for the master node.

In another aspect of the invention, a multiple-bus hierarchical control network is provided. A first-tier master node controls a plurality of first-tier slave nodes using a first common bus for communication. One of the first-tier slave nodes is connected to a second common bus, and operates as a second-tier master node for a plurality of second-tier slave nodes connected to the second common bus. Should a failure of the first-tier master node occur, any of the first-tier slave nodes connected to the first common bus can take over the first-tier master node, doing so according to their programmed priority. Should a failure of the second-tier master node occur, any of the second-tier slave nodes connected to the second common bus can take over the second-tier master node, doing so according to their programmed priority. Redundant master control is thereby provided for both the first tier and second tier in the hierarchical control network.

A preferred node comprises two separate transceivers, an uplink transceiver for receiving control information, and a downlink transceiver for sending out control information. Each node therefore has the capability of performing either in a master mode or a slave mode, or in both modes simultaneously.

Further variations and embodiments are also disclosed herein, and are described hereinafter and/or depicted in the figures.

BRIEF DESCRIPTION OF THE DRAWINGS

FIG. 5 is a block diagram of a preferred control network architecture in accordance with one or more aspects of the present invention.

FIG. 6 is a block diagram of a preferred node within the control network architecture shown in FIG. 5.

DETAILED DESCRIPTION OF THE PREFERRED EMBODIMENT(S)

This application is related to U.S. Pat. No. 5,907,486 and entitled "Wiring Method and Apparatus for Distributed Control Network," U.S. patent application Ser. No. 08/853,989 filed in the name of inventor Jeffrey Ying, entitled "Multi-Tier Architecture For Control Network," and U.S. patent application Ser. No. 08/854,160 filed in the name of inventor Jeffrey Ying and entitled "Backup Control Mechanism In A Distributed Control Network," all three of which foregoing applications are filed concurrently herewith and hereby incorporated by reference as if set forth fully herein.

Figure 1:
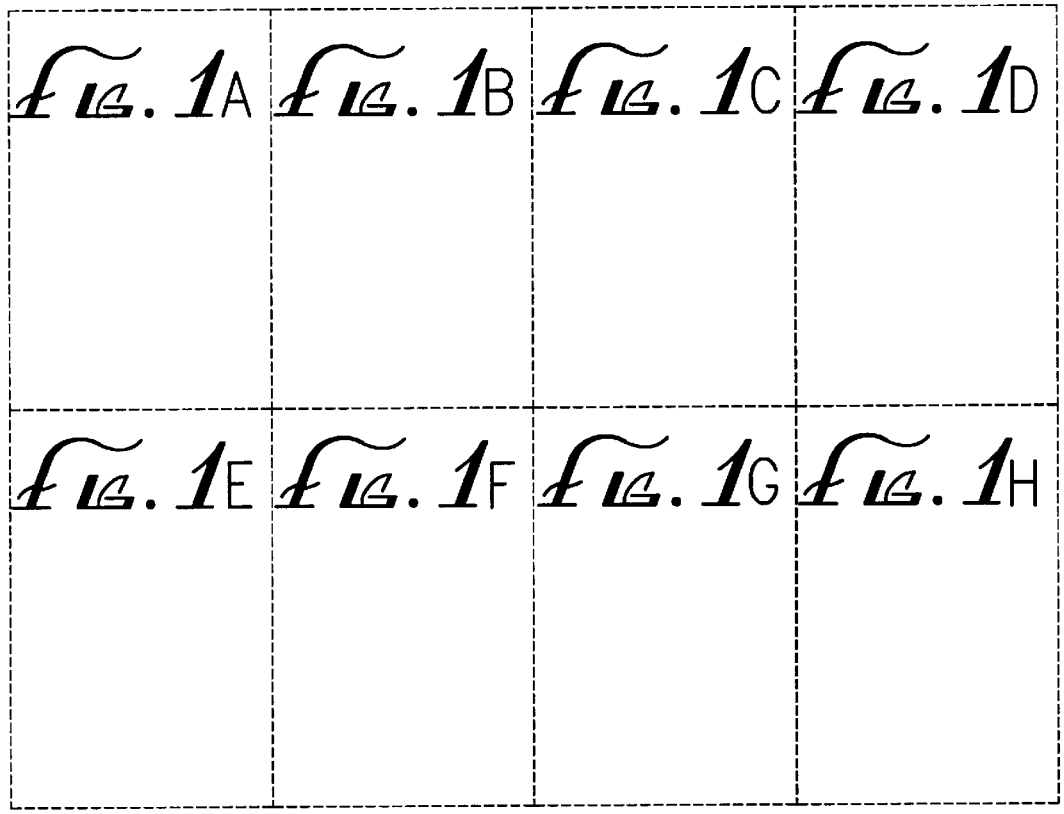
FIG. 1 is a functional diagram of a hierarchical control network as known in the prior art.
Figure 1A:
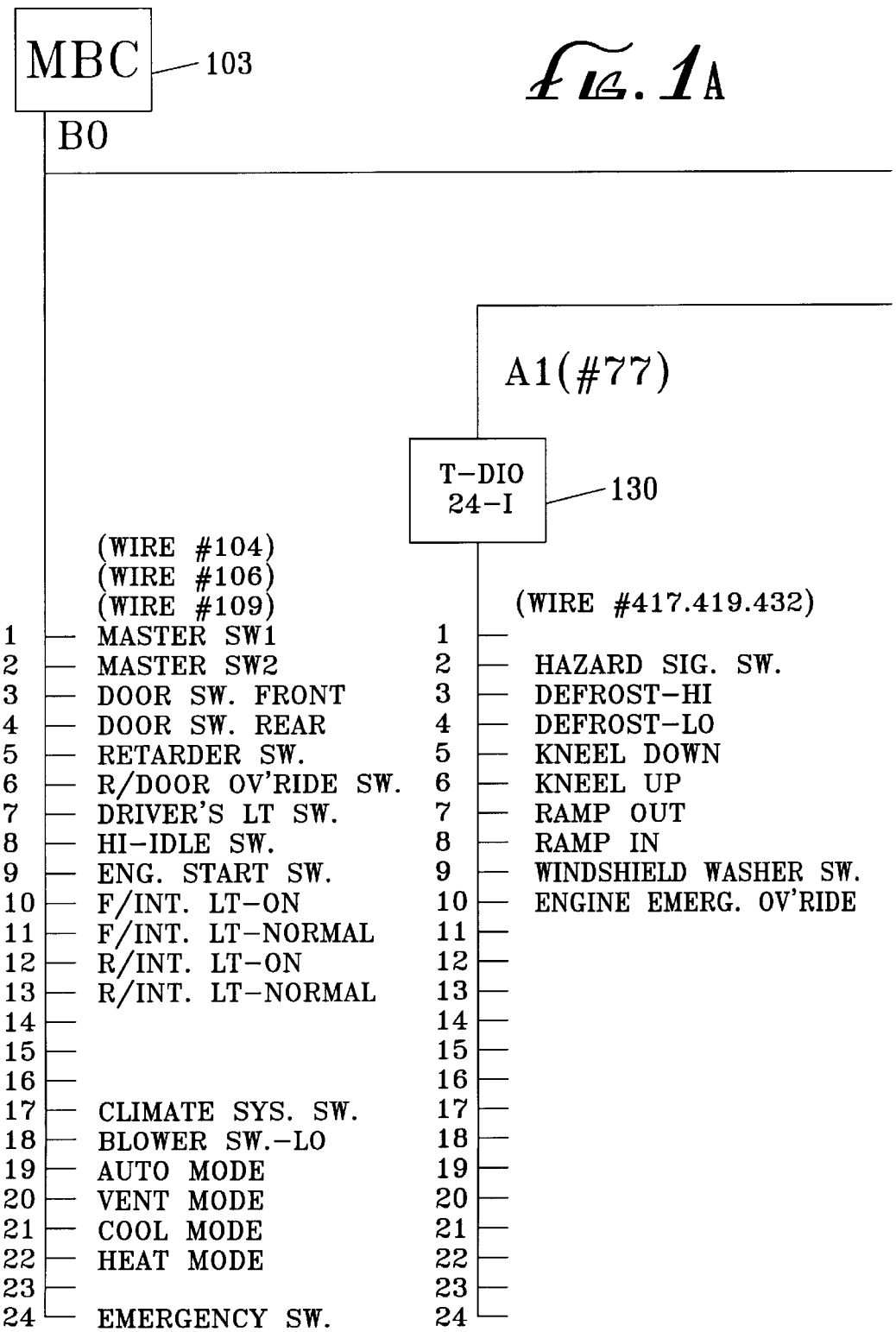
Figure 1B:
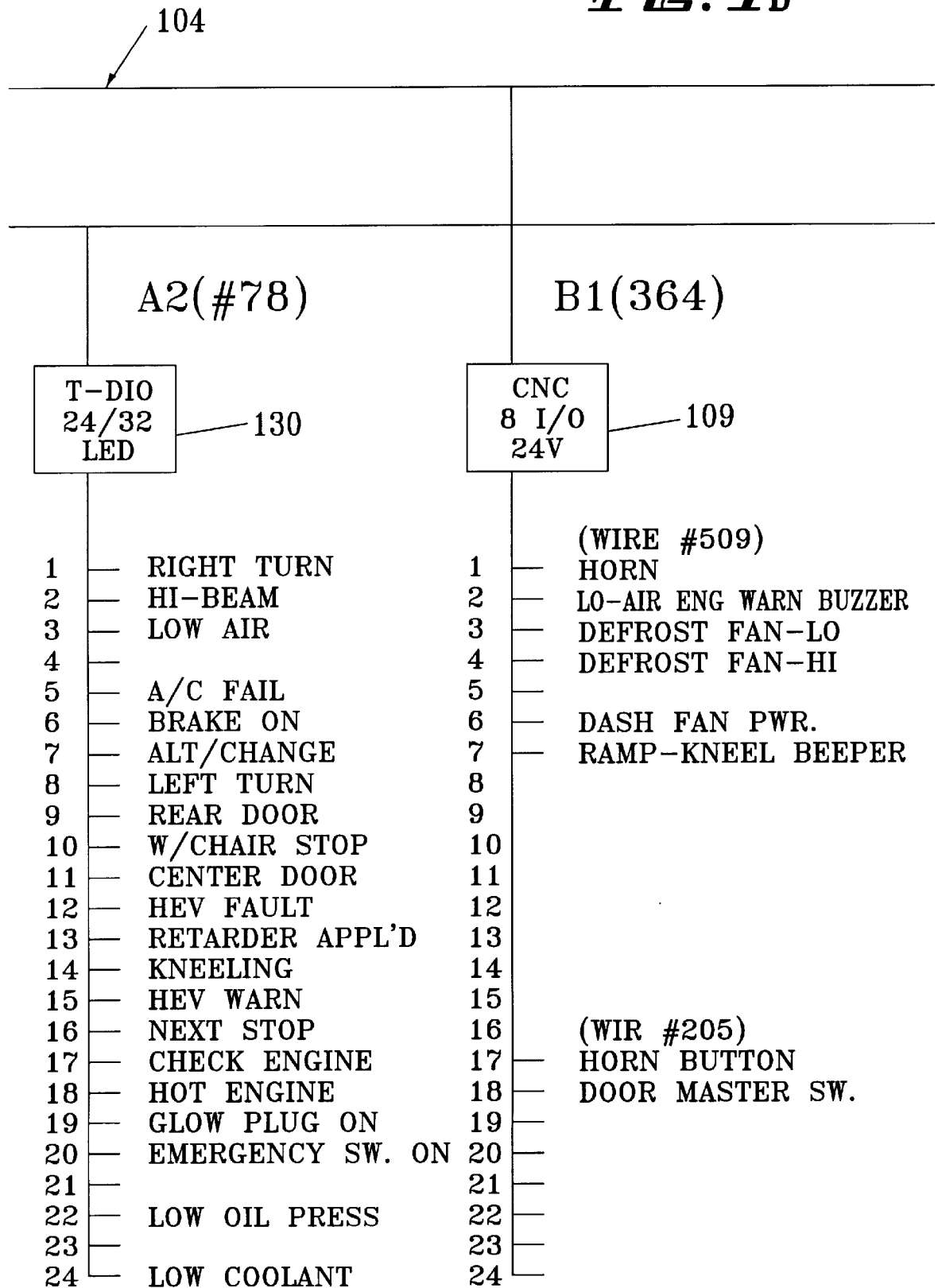
Figure 1C:
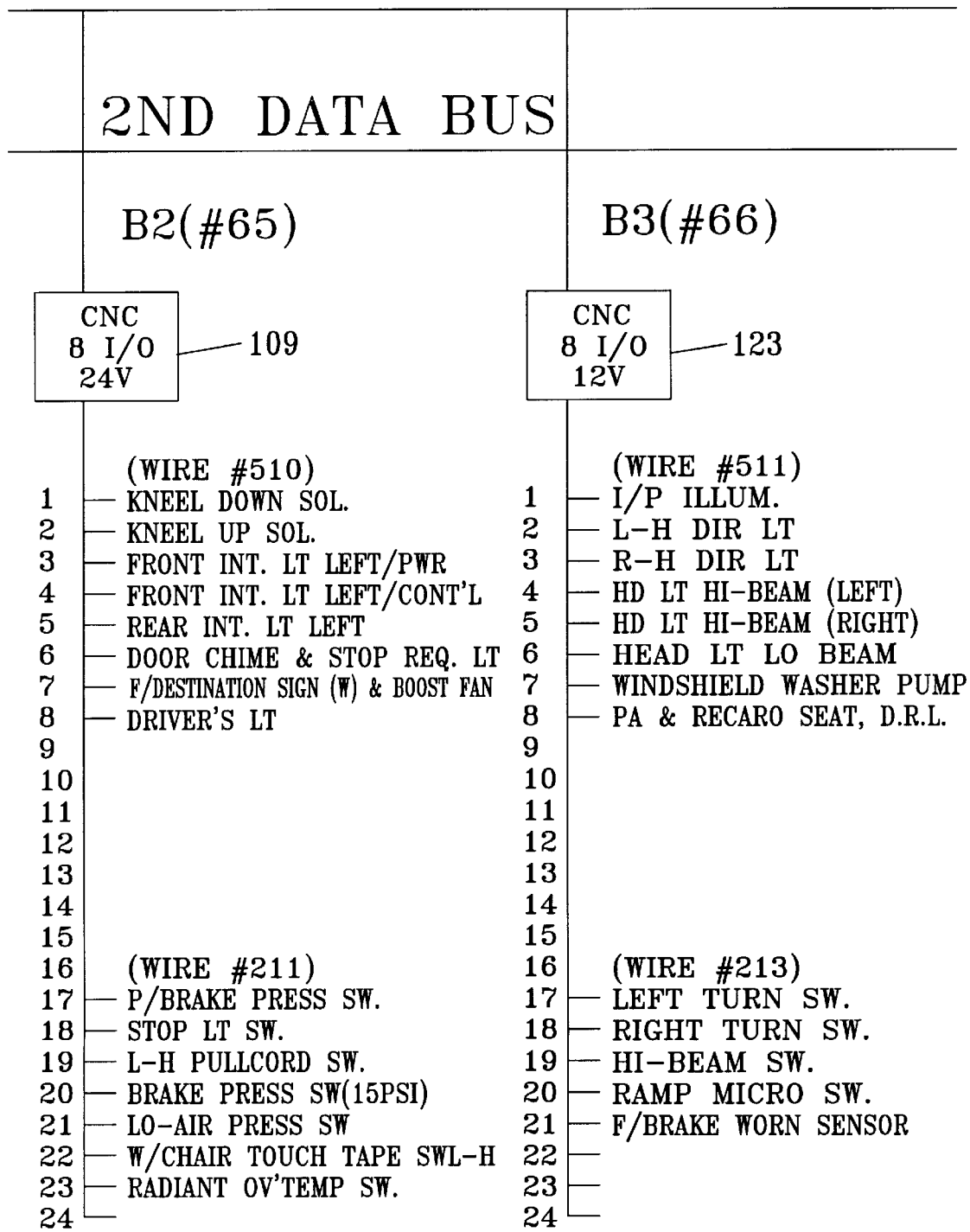
Figure 1D:
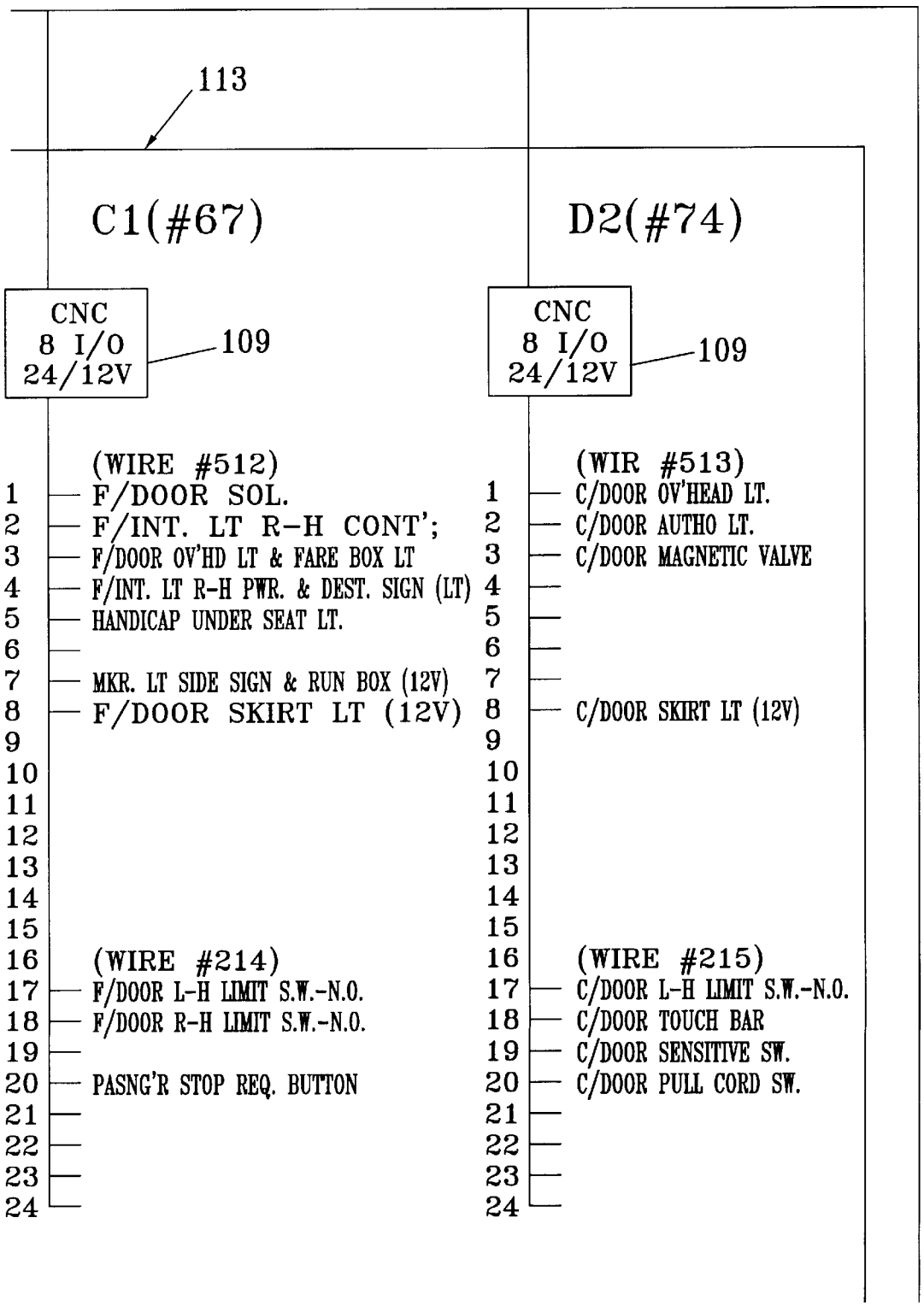
Figure 1E:
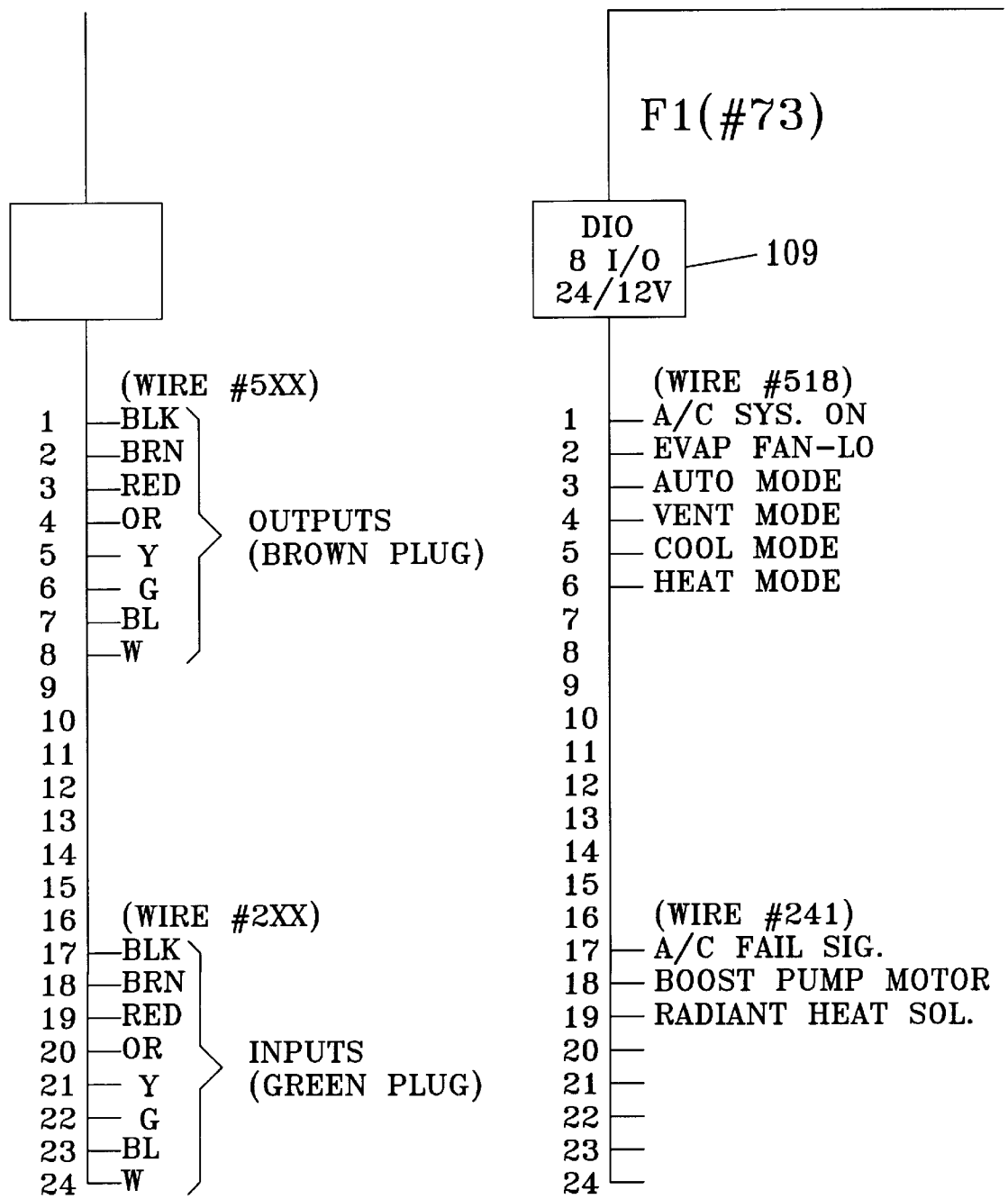
Figure 1F:
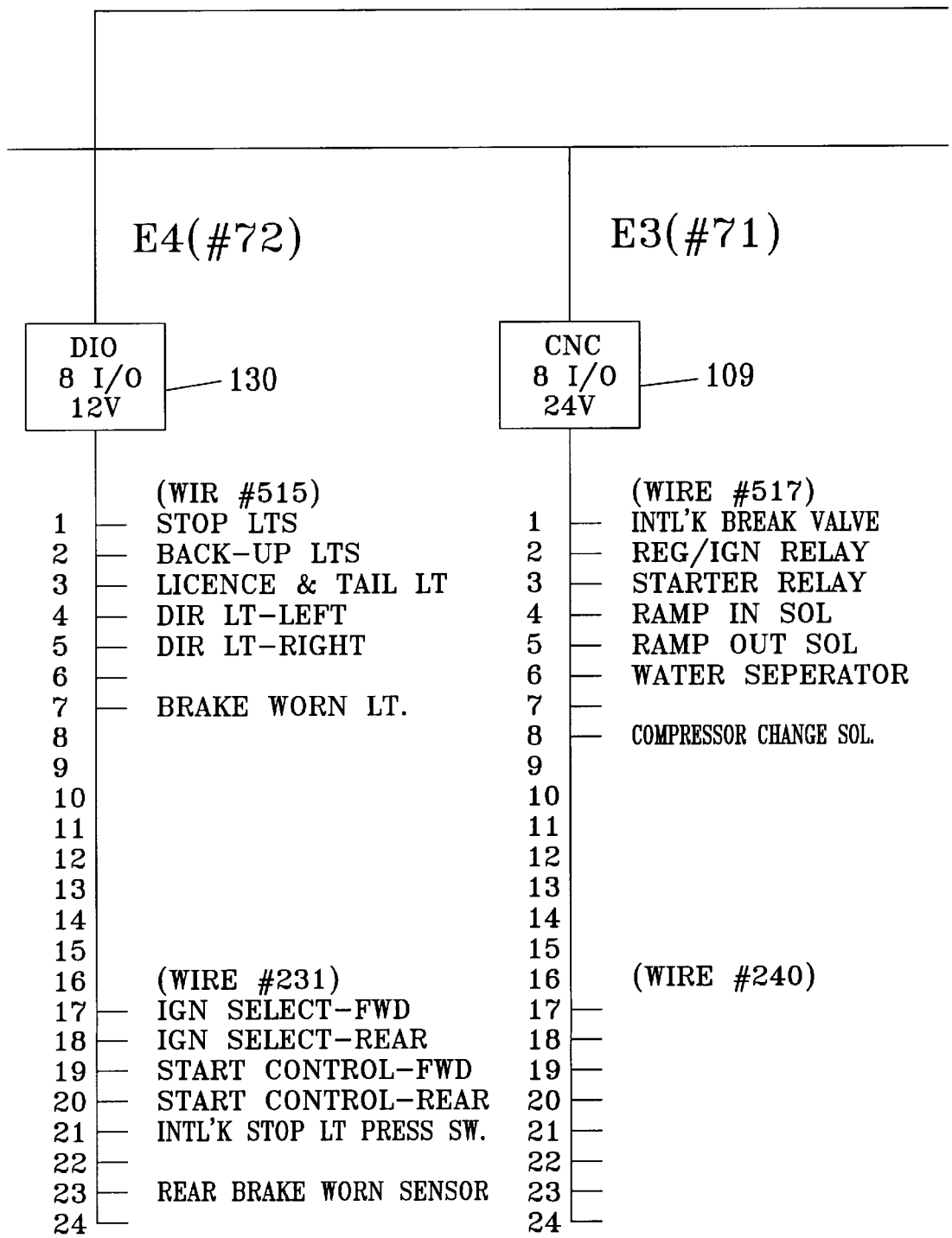
Figure 1G:
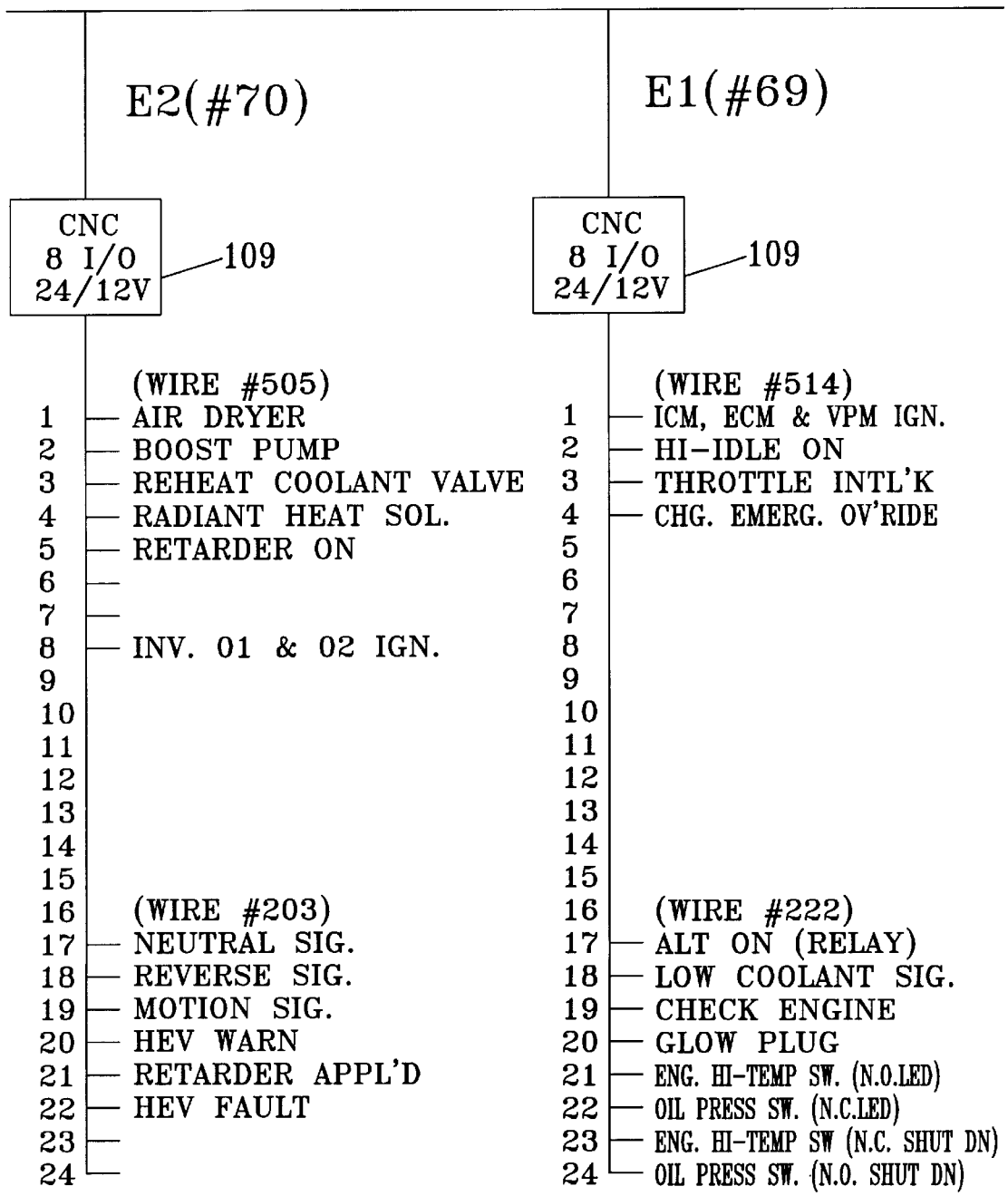

FIG. 1 is a block diagram showing the interconnection of nodes in a particular type of control network 101 as known in the art. The control network 101 comprises a main data bus controller 103 which is connected over a main data bus 104 to a plurality of first-tier slave nodes 109 and 123. One first-tier slave node 123 connected to the main data bus 104 also functions as a second data bus controller, and is connected to a second data bus 113. The second data bus controller 123 is connected over the second data bus 113 to a plurality of second-tier slave nodes 130. The main data bus 104 forms a high-speed, bi-directional communication link between the main data bus controller 103 and the first-tier slave nodes 109 and 123, and the second data bus 113 forms a low-speed, bidirectional communication link between the second data bus controller 123 and the second-tier slave nodes 130.

The nature of the slave nodes 109, 123 and 130 depends in part on the control application for which they are deployed. In a transit vehicle or railcar, for example, the master data bus controller 103 and the slave nodes 109, 123 and 130 may each be assigned to control a particular section of the vehicle or railcar, or may be assigned to control particular input and output functions. For each slave node 109, 123 and 130 in FIG. 1, various control signals are shown connected to the nodes such as to illustrate one exemplary arrangement of control functionality.

In operation, the main controller 103 communicates with the first-tier slave nodes 109 and 123 using the main data bus 104 as a high speed bi-direction link. An exemplary baud rate for communications over the main data bus 104 is 256 k. The main data bus controller 103 is generally responsible for delegating control commands to the first-tier slave nodes 109 and 123, and for responding to status information and events communicated to the main data bus controller 103 over the main data bus 104. Each of the first-tier slave nodes 109 and 123 receives commands from the main data bus controller 103, and issues appropriate commands over their respective control lines. In a similar manner, the second data bus controller 123 communicates with the second-tier slave nodes 130 using the second data bus 113 as a low speed bi-direction link (having a baud rate of, e.g., 9.6 k), and instructs the second-tier slave nodes 130 to carry out certain control functions, or responds to status messages or events relayed to the second data bus controller 123 from the second-tier slave nodes 130.

Figure 2:
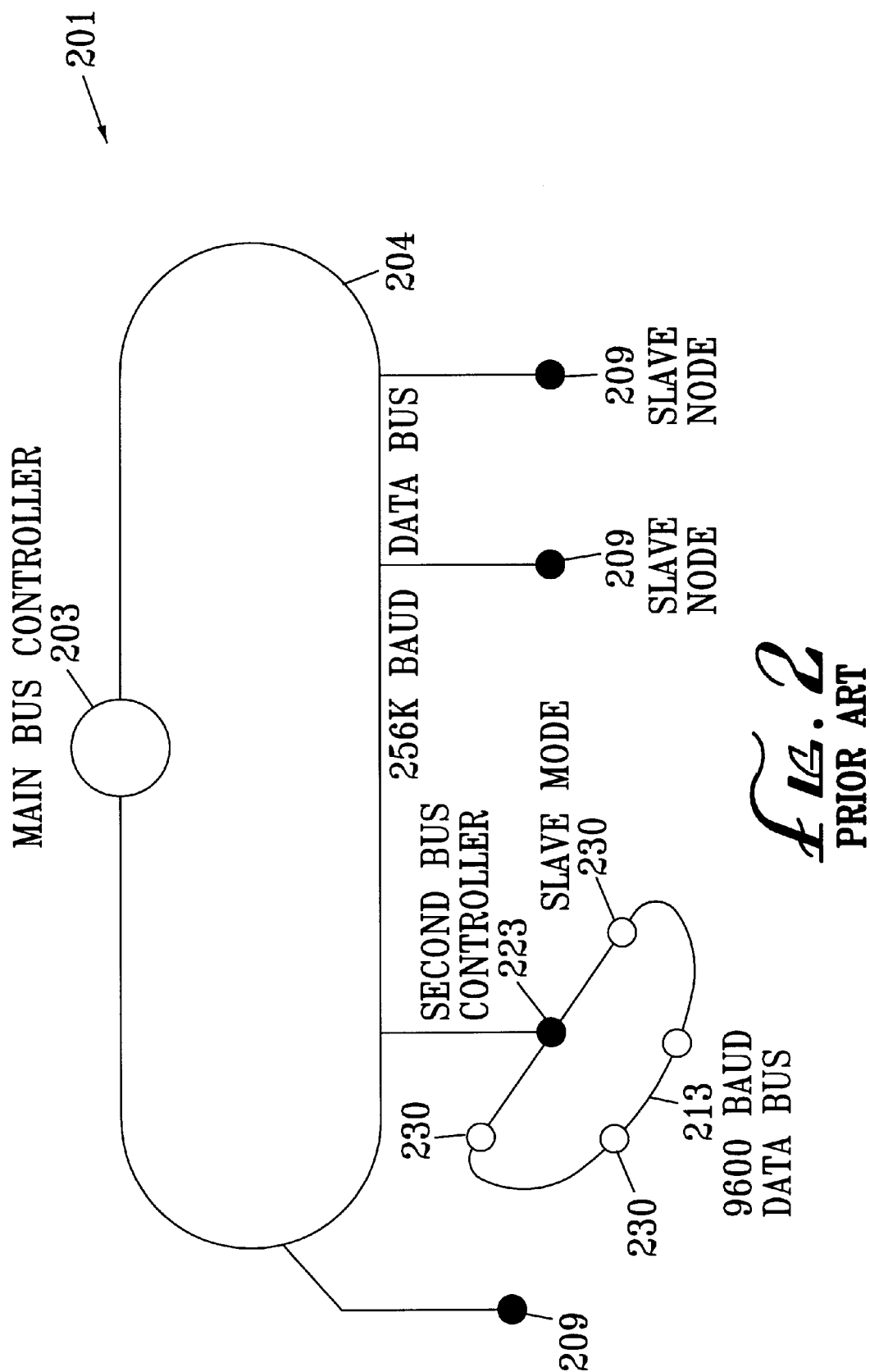
FIG. 2 is a diagram of a distributed control system having a dual-bus architecture as known in the prior art.

FIG. 2 is a diagram showing the layout or architecture of the FIG. 1 control network. The control network 201 shown in FIG. 2 comprises a main data bus controller 203 which is connected to a main data bus 204. The main data bus 204 is physically connected to a plurality of first-tier slave nodes 209 and 223. As explained with respect to the control network 101 shown in the FIG. 1, one of the first-tier slave nodes 223 also functions as a second data bus controller 223, and is connected over a second data bus 213 to a plurality of second-tier slave nodes 230. The main data bus 204 is configured in a loop such that it passes through each of the first-tier slave nodes 209 and 230 and returns to rejoin the main data bus controller 203. In this way, should the wires of the main bus 204 become severed, the main data bus controller 203 will still be connected to the first-tier slave nodes 209 and 223 and will not necessarily lose control over the system. Similarly, the second data bus 213 is configured in a loop such that it passes through each of the second-tier slave nodes 230 and returns to rejoin the second data bus controller 223, thereby providing an architecture resilient to potential severing of the wires of the second data bus 113. Each of the main data bus controller 203, first-tier slave nodes 209 and 223, and second-tier slave nodes 230 may be connected to a plurality of control signals for performing control or sensor functions, or various other input and output functions as necessary for the particular control application.

The control network 201 shown in FIG. 2 thus utilizes a dual-bus architecture to perform control functions. Because of the hierarchical architecture of the control system 201, relatively low baud rates on the second data bus 213 can be tolerated, leading to reduced system size, cost and complexity over traditional non-hierarchical, relay-based systems. The slower speed on the secondary data bus 213 also reduces the system's susceptibility to electromagnetic interference, a potential problem in certain control system environments (such as railcars).

Figure 3:
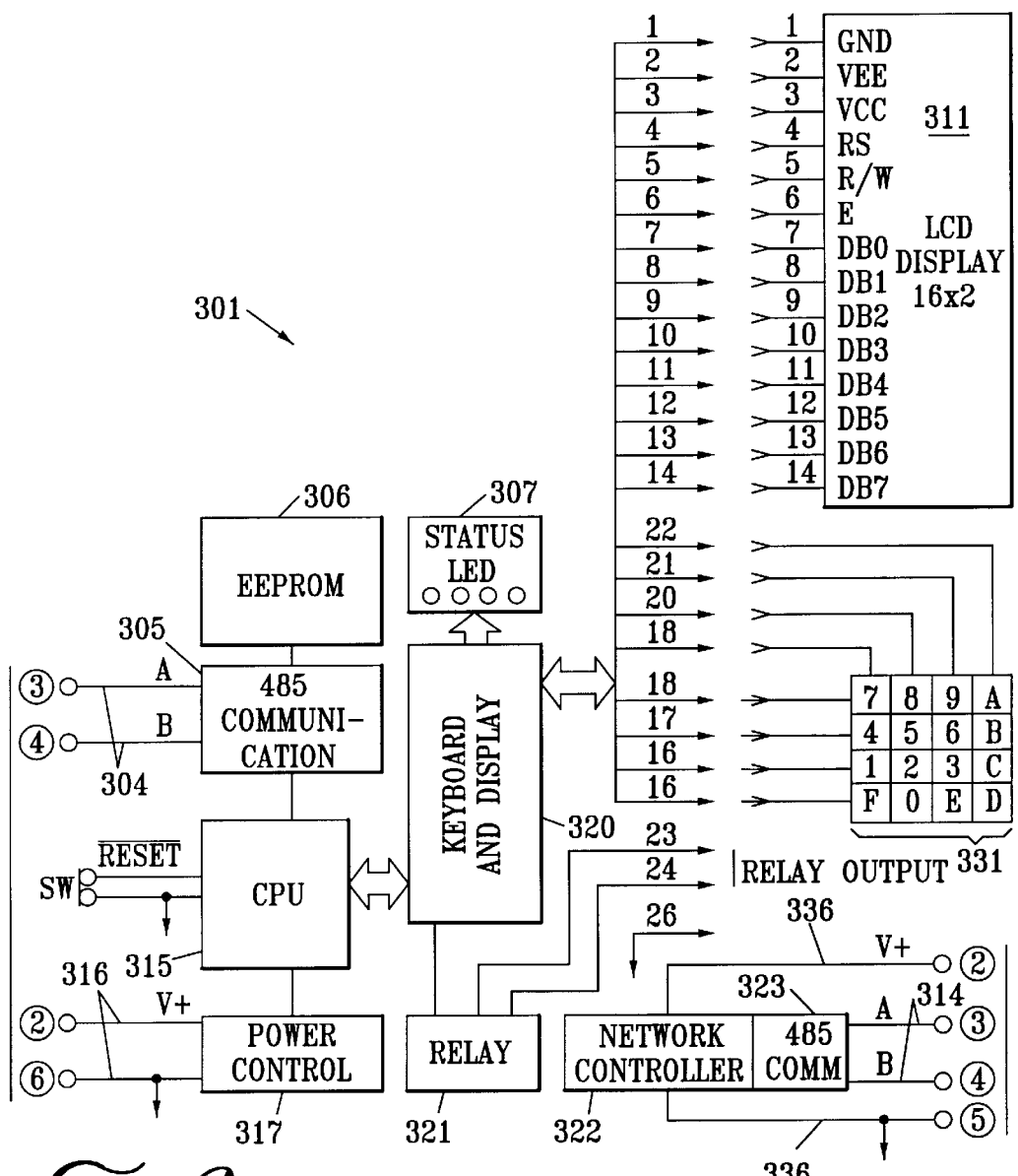
FIG. 3 is a block diagram of a module or node that may be employed in the distributed control system of FIG. 2.

Each node, whether master data bus controller 203, first-tier slave node 209 or 223, or second-tier slave node 230, includes means for performing computations necessary for its functionality, and is configured with components such as a central processing unit (CPU) and memory. FIG. 3 is a more detailed block diagram of a node 301 (such as the master data bus controller 203, a first-tier slave node 209 or 223, or a second-tier slave node 230) that may be employed in the control network of FIG. 2. The node 301 comprises a CPU 315 connected to a power control block 317 and a transceiver 305. The node 301 is also connected to power signal lines 316, which connect to the power control block 317. The node 301 may communicate over communication signal lines 304, which are connected to the transceiver 305. An electrical erasable programmable read-only memory (EEPROM) 306 stores programming information utilized by the CPU 315 for carrying out certain programmable functions. The CPU 315 has access to a random access memory (RAM) (not shown) and read-only memory (ROM) (not shown) as needed for the particular application.

The CPU 315 is connected to a keyboard and display interface block 320. The keyboard and display interface block 320 is connected to status LEDs 307, relays 321, and LED display 311 and a keypad 331. The node 301 is thereby can accept manual inputs (e.g., from the keypad 331) or receive sensor inputs (e.g., over relays 321), and can display operational status using status LEDs 301 or LCD display 311.

The node 301 further comprises a network controller 322 which preferably comprises a second CPU. The network controller 322 is connected to a second transceiver 323 which is connected to a second pair of communication signal lines 314. The network controller also outputs power signal lines 336.

In operation, node 301 may communicate over two different data buses using transceivers 305 and 323. Thus, node 301 may communicate over a first data bus (such as data bus 204 shown in FIG. 1) by receiving and transmitting signals over communication signal lines 314 using transceiver 323, under control of the network controller 322. The node 301 may communicate over a second data bus (such as data bus 213 shown in FIG. 2) by transmitting and receiving signals over communication signal lines 304 using transceiver 305, under control of CPU 315. The CPU 315 and network controller 322 may transfer information back and forth using a shared memory (not shown). The node 301 may serve as both a "slave" unit with respect to the first data bus 204 and a "master" unit with respect to the second data bus 213. By interconnecting a plurality of nodes 301 in an appropriate configuration, a hierarchical control network with two data buses (as shown in FIG. 2) may be established.

Figure 4:
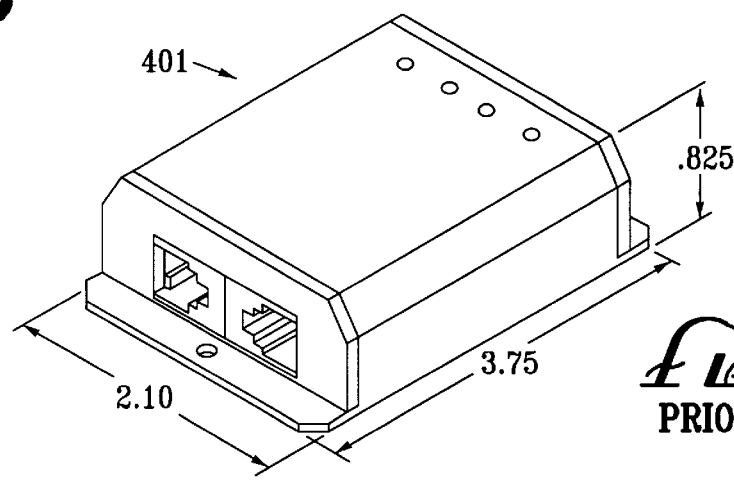
FIG. 4 is a diagram showing a physical encasement of the module or node shown in FIG. 3.

Each node 301 such as shown in FIG. 3 is housed in a rugged, potted case made of a suitable lightweight material such as aluminum that provides environmental protection and allows for heat dissipation. FIG. 4 is a diagram showing an exemplary physical casing 401 of a module or node 301 such as shown in FIG. 3. The casing 401 can be quite small; in the example of FIG. 4, the casing 401 measures approximately 2.1" by 3.75", and is 0.825" in thickness.

A problem that can occur in operation of a control network such as shown in FIG. 2 is that if the master data bus controller 203 fails then operation of the entire system could be jeopardized. A possible solution would be to provide a redundant master data bus controller that has the same functionality as the primary master data bus controller 203 in all respects. Upon detecting a failure of the primary master data bus controller 203, the backup master data bus controller could shut down the primary master data bus controller 203 and take over control of the network.

While having such a separate, redundant master data bus controller for backup purposes may provide a solution where the primary master data bus controller 203 fails, it falls short of being a complete solution. As an entirely separate controller having complete functional and hardware redundancy of the primary master data bus controller 203, incorporation of the backup master data bus controller effectively doubles the cost of implementing the master data bus controller 203. Also, another drawback is that if both the master data bus controller 203 the backup master data bus controller fail, then operation of the entire system would be jeopardized and operation could come to complete halt.

In addition to the possibility of the master data bus controller 203 failing, the second data bus controller 223 could also be subject to failure. While a redundant second data bus controller for backup purposes could be provided, the cost of implementing the second data bus controller would be essentially doubled, and the system is still subject to potentially complete failure should the second data bus controller also fail. Moreover, adding redundant data bus controllers could complicate the wiring of the system.

A preferred embodiment of the invention overcomes one or more of the above problems by providing redundant backup control for the master data bus controller 203 or other type of master node, the second data bus controller 223 or similar types of nodes, and, if further nested control levels exist (as described, for example, in later embodiments herein), other sub-controllers for those control levels.

FIG. 5 is a block diagram of a preferred embodiment of a control network 501 having redundant backup control capability for a master node at each bus level of the control network 501. Hereinafter, the node acting as the master bus controller for a particular bus will be referred to as the "master node" for that particular bus, and all the other nodes on that bus will be referred to as "slave nodes" for that particular bus. In the control network shown in FIG. 5, a master node 503 and a plurality of first-tier slave nodes 523 are connected to a main data bus 504. In a preferred embodiment of the invention, each of the slave nodes 523 is configured or can be configured to control a secondary data bus. For example, the first-tier slave node 523c is shown connected to a secondary data bus 523 in the control network 501. The first-tier slave node 523c functions as a second-tier master node with respect to second-tier slave nodes 533 connected to the secondary data bus 513. Others of the first-tier slave nodes 523 can also serve as second-tier master nodes and be connected to different secondary buses having additional second-tier slave nodes. A multi-level or multi-tiered hierarchical control network is thereby established.

Each of the master node 503, first-tier slave nodes 523, second-tier slave nodes 533, and other lower-level slave nodes (not shown in FIG. 5) are referred to hereinafter generically as "nodes" and are designated as nodes 530 in FIG. 5. In one aspect of a preferred embodiment as shown in FIG. 5, each of the nodes 530 has substantially the same hardware configuration and can therefore function as either a master node or a slave node, depending upon how the control network 501 is configured. Each data bus, along with the nodes attached to it, are generally referred to as a cell, and the master node connected to the data bus is referred to as a "cell controller" for that particular cell. As explained in more detail hereinafter, each node 530 configured as a master node transmits and receives messages over the data bus for the cell it controls. Each node 530 configured as a slave node remains in a listen mode, receiving but not transmitting messages over that data bus, unless specifically requested to transmit information over the data bus by the master node. Any number of the slave nodes can, even though operating as a slave node with respect to an upper tier, be simultaneously operating as a master node with respect to other lower-tier slave nodes at a different cell sub-level.

A preferred embodiment of the invention, as noted, comprises a mechanism for redundant backup control of any node functioning as a master node at any level or sub-level of the control network 501. As generally described, in operation of a preferred embodiment of the invention the slave nodes connected to a particular data bus monitor the data bus while in a listen mode and await periodic signals from the master node for that data bus. Upon a failure to receive a signal from a master node within an expected time, the slave nodes connected to that data bus begin a wait period (which is preferably a different wait period for each slave node connected to the data bus). When the wait period elapses, the slave node determines that a failure in the master node for the particular data bus has occurred, and takes steps to take over the functionality of the master node. Each of the slave nodes is programmed with a different wait period, so that there is no contention for replacing the master node when a master node failure has occurred. In one aspect, backup control of each master node is prioritized, such that there is a specific order in which the slave nodes can potentially take over control of the master node functionality when a failure has occurred.

In more detail, again with reference to FIG. 5, one of the nodes 530 attached to the main data bus 504 is configured as a master node 503. The other nodes 530 attached to the main data bus 504 (in this example numbering four such nodes 530) are configured as first-tier slave nodes 523, meaning that they receive but do not transmit master-control signals over the main data bus 504. The first-tier slave nodes 523 may, however, from time to time send responsive signals or status signals over the main data bus 504.

In a preferred embodiment, each of the first-tier slave nodes 523 may be configured as a second-tier master node controlling a secondary bus. One such example is shown in FIG. 5, wherein first-tier slave node 523c is connected to a secondary data bus 513. A plurality of other nodes 530 are also attached to the secondary bus data 513, and serve as second-tier slave nodes 533. There are three such second-tier slave nodes 533 in the example shown in FIG. 5. With respect to the secondary data bus 513, the first-tier slave/second-tier master node 523c transmits master-control signals to the second-tier slave nodes 533. The second-tier slave nodes 533 ordinarily operate only in a listen mode, but from time to time may send responsive messages or status messages to the second-tier master node 523c. The other first-tier slave nodes 523a, 523b and 523d may similarly be connected as second-tier master nodes (i.e., cell controllers) each controlling its own secondary bus or cell.

While the control network 501 shown in FIG. 5 has four first-tier slave nodes 523 and three second-tier slave nodes 533, the number of first-tier slave nodes 523 and second-tier slave nodes 533 is limited only by the ability of the master node to communicate with the slave nodes over the particular data bus. There may be more slave nodes or fewer slave nodes on each bus than shown in the control network 501. In a preferred embodiment, there are no more than eight such cell controllers, although more than eight may be used so long as processing capacity and speed permit.

In addition, further levels of control nesting beyond two data buses may also be provided, using a similar approach to the two data bus method. Thus, for example, one or more of the second-tier slave nodes 533 may be configured as a third-tier master node controlling its own tertiary or third-tier data bus. While FIG. 5 only shows two nested control levels, the same control concepts would apply to a control network architecture having additional nested control levels.

In a preferred embodiment, communication over the main data bus 504 and the secondary data bus 513 (or buses, if appropriate) is time-multiplexed such that only one node 530 is transmitting over a particular data bus at a given time. Usually, each transmitted message will be targeted for a specific destination node 530, which may be specified by address bits in the transmitted message. However, in some embodiments broadcast messages may also be used targeted to multiple nodes 530.

Responsibilities for tasks, or groups of tasks, may be assigned to specific nodes 530. For example, each of the first-tier slave nodes 223 may be assigned a distinct sphere of responsibility. Similarly, each of the second-tier slave nodes 533 may be assigned a distinct sphere of responsibility. Examples of tasks that may be assigned to different nodes 530 are described for an exemplary control network later herein, with respect to FIG. 9.

Each of the nodes 530 preferably comprises an uplink transceiver 507, a downlink transceiver 508, and a switch 509. Each of the nodes 530 receives signals over its downlink transceiver 508. Over the main data bus 504, the first-tier master node 503 transmits master-control signals to each of the first-tier slave nodes 523. From time to time, according to the programmed control protocol, the first-tier slave nodes 523 respond to the master-control signals, or otherwise send status messages to the first-tier master node 503 when events occur specific to that first-tier slave node 523. Otherwise, the first-tier slave nodes 523 do not ordinarily communicate with each other.

In a similar manner, over each secondary data bus (such as secondary data bus 513), the second-tier master node 523 (for example, first-tier slave/second-tier master node 523c in FIG. 5) transmits master-control signals to each of the second-tier slave nodes 533 connected to the same secondary data bus. From time to time, according to the programmed control protocol, the second-tier slave nodes 533 respond to the master-control signals, or otherwise send status messages to the second-tier master node 523c when events occur specific to that second-tier slave node 533. Otherwise, the second-tier slave nodes 523 do not ordinarily communicate with each other.

Communication between nodes is preferably carried out using half-duplex time division multiplexing. In typical operation, the master node polls each of the slave nodes periodically. Each of the nodes is preferably provided with a unique node identification number or address that distinguishes it from all other nodes of the control network. The master node sends a control message to each slave unit in turn, using the node identification number or address to identify the intended destination. Each of the slave nodes receives the control message but only reacts if it recognizes its own node identification number or address in the control message. The slave node takes the actions requested by the control message received from the master node. Within a designated time period after receiving the control message, the slave node responds to the master node with an acknowledgment message. Each of the slave nodes are polled in turn so that the master node can keep track of events happening throughout the system.

A communication protocol is preferably established so as to avoid collisions on each of the data buses. A simple and effective communication protocol is one in which the master node for the particular data bus sends a control message to a particular slave node, which responds with an acknowledgment or status message within a predetermined amount of time before the master node contacts another slave node. Slave nodes generally do not initiate communication without being first polled by the master node. The master node may also send out a broadcast control message that is intended for receipt by more than one of the slave nodes. The broadcast control message can comprise a node identification number or address that instructs a single particular node to respond to the broadcast control message. Usually, the single node selected for response will be the most critical node requiring receipt of the broadcast control message.

Failure of the current master node (at any of the control levels) commonly results in the master node either failing to transmit, or else transmitting improper control information to the slave nodes over the data bus. According to a preferred redundant backup control protocol, the slave nodes periodically receive master-control messages from the master node and, in the event that proper master-control messages fail to appear, initiate a failure mode response procedure.

Detection of and response to a failure mode condition may be explained in greater detail with reference to FIG. 6, which is a block diagram of a preferred embodiment depicting most of the main components of a node (such as any of nodes 530 shown in FIG. 5). Because failure mode detection and response is carried out by a node 530 operating as a slave node, the following discussion will assume that the node 603 shown in FIG. 6 is initially configured as a slave node. Further, for simplicity of explanation, it will be assumed that the node 603 shown in FIG. 6 is a first-tier slave/second-tier master node connected to a main bus and a secondary bus (such as first-tier slave/second-tier master node 523c connected to the main data bus 504 and secondary data bus 513 in FIG. 5), although the same node circuit configuration is preferably used for each of the nodes 530, regardless of control level, for ease of construction and flexibility purposes.

In the node block diagram of FIG. 6, a node 603 is shown connected to a first bus (e.g., main bus) 604. The node 603 comprises an uplink transceiver 611, a downlink transceiver 621, a CPU 612 connected to the uplink transceiver 611, and another CPU 622 connected to the downlink transceiver 621. Both CPUs 612, 622 are preferably connected to a dual-port RAM 618, and each CPU 612, 622 is connected to a ROM program store 614 and 624, respectively. The second CPU 622 is connected through an appropriate interface to I/O ports 654, which may comprise sensor inputs, control signal outputs, status LEDs, LCD display, keypad, or other types of external connections. It will be understood that the node 603 of FIG. 6 can have all the components and functionality of the node 301 shown in FIG. 3; however, in FIG. 6 only certain basic components needed for explaining the operation of the invention are depicted.

Each node 603 is preferably capable of both sending and receiving messages (e.g., control instructions). Typically, the uplink transceiver 611 operates in a "slave" mode whereby the node 603 receives control instructions using the uplink transceiver 611 and then responds thereto, and the downlink transceiver 621 operates in a "master" mode whereby the node 603 issues control instructions (e.g., polls slave nodes) and awaits a response from other nodes after sending such control instructions.

The downlink transceiver 621 of the node 603 is connected to a secondary data bus 652, to which is also connected a plurality of second-tier slave nodes 651 (assuming the node 603 is a first-tier slave/second-tier master node). The node 603 thereby functions as a first-tier slave node with respect to the main data bus 604, receiving with its uplink transceiver 611 first-tier master-control signals over the main bus 604 from a first-tier master node (such as master node 503 shown in FIG. 5), and also functions as a second-tier master node with respect to the secondary data bus 652, transmitting second-tier master-control signals with its downlink transceiver 621 to second-tier slave nodes 651.

The node 603 also comprises a pair of switches 635a, 635b connected between the downlink transceiver 621 and the signal lines 643a, 643b of the main data bus 604. In normal operation, the switches 635a, 635b remain open (unless the node 503 is also the first-tier master node, such as master node 503 shown in FIG. 5, in which case the switches 635a, 635b would be closed), and the downlink transceiver 621 is thereby isolated from the main data bus 604. However, when a first-tier master node failure condition is detected, switches 635a, 635b are closed, enabling the downlink transceiver 621 to take over for the first-tier master node. The downlink transceiver 621 would therefore function simultaneously as master node with respect to both the main data bus 604 and the secondary data bus 652.

In a preferred embodiment, detection of a master node failure condition on the main data bus 604 is accomplished using a timer mechanism, such as a hardware timer 613 accessible (either directly or indirectly) by the CPU 612 that is connected to the uplink transceiver 611. According to a preferred control protocol (assuming the node 603 is a first-tier slave/second-tier master node), the uplink transceiver 611 of node 603 receives first-tier master-control signals periodically from the first-tier master node (such as master node 503 in FIG. 5). The master-control signals may, for example, request status information from the node 603, or instruct the node 603 to carry out certain control or input/output functions. The node 603 ordinarily responds by carrying out the requested functions and/or sending an acknowledgment or status signal to the first-tier master control node using the uplink transceiver 611.

Timer 613 times out a wait period between master-control signals received from the first-tier master control node. In a preferred embodiment, each time the uplink transceiver 611 receives a master-control signal from the first-tier master node that is recognized as an appropriate master-control signal within the particular programmed control protocol (whether or not the master-control signal is directed to the particular node 603), the CPU 612 connected to the uplink transceiver 611 resets the timer 613. If the timer 613 ever times out, then CPU 612 responds by asserting a failure mode response procedure. The timing out of timer 613 may result in an interrupt to CPU 612 in order to inform the CPU 612 of the failure to receive master-control signals, or else the CPU 612 may periodically monitor the timer 613 and, when the CPU 612 notices that the timer 613 has timed out, assert a failure mode response procedure.

When a failure mode condition is detected, the CPU 612 sets a failure mode status bit in a predetermined flag location within the dual-port RAM 618. The other CPU 622 periodically monitors the failure mode status bit in the dual-port RAM 618 and is thereby informed when a failure occurs. Alternatively, instead of the CPUs 612, 622 communicating through the dual-port RAM 618, timer 613 can directly inform CPU 622 when a failure to receive master-control signals has occurred (i.e., when timer 613 has timed out).

When the CPU 622 has been informed or otherwise determined that a failure mode condition exists, and that the first-tier master node has presumably failed, the CPU 622 sends a signal over control line 633 to close switches 635a, 635b, thereby connecting the downlink transceiver 621 to the main bus 604. From that point on, the CPU 622 performs as the first-tier master node with respect to the main bus 604. The node 603 can continue to receive information over the main data bus 604 using the uplink transceiver 611. Alternatively, the node 603 may thereafter perform all transmission and reception over both the main bus 604 and the secondary bus 652 using the downlink transceiver 621. When the failure mode is entered, the CPU 622 may be programmed so as to directly carry out the I/O port functions for which it previously received instructions from the first-tier master node, or the node 603 may send master-control signals to its own uplink transceiver 611 and thereby continue to carry out the I/O port functions as it had previously been doing. In other words, the node 603 can give itself control instructions over the main data bus 604 so that it can continue to perform its previously assigned functions. If, after taking over for the first-tier master node, the node's downlink transceiver 611 should fail, the node 603 can still continue to perform its control functions when the next slave node takes over control as the new first-tier master node (as later described herein), because its uplink transceiver 611 continues to function in a normal manner.

According to the above described technique, the node 603 thereby substitutes itself for the first-tier master node upon the detection of a first-tier master node failure as indicated by the failure to receive the expected first-tier master-control signals. Should the node 603 fail, either before or after taking over control for the first-tier master node, the next first-tier slave node would take over and become the first-tier master node in a similar manner to that described above.

Referring again to FIG. 5, the order in which the first-tier slave nodes 523 take over for the first-tier master node 503 is dictated by the wait period timed out by the timer 613 of the particular first-tier slave node 523. The timer 613 (see FIG. 6) for each first-tier slave node 523 is programmed or reset using a different time-out value. A first-tier slave node 523 only asserts a failure mode condition when its internal timer 613 reaches the particular timeout value programmed for that particular node 523.

While the programmed wait periods for the internal timer 613 in each first-tier slave node 523 can vary depending upon the control application, illustrative wait periods are programmed in ten millisecond increments. Thus, for example, first-tier slave node 523a could be programmed with a 10 millisecond wait period; the next first-tier slave node 523b could be programmed with a 20 millisecond wait period; the next first-tier slave node 523c could be programmed with a 30 millisecond wait period; and the last first-tier slave node 523d could be programmed with a 40 millisecond wait period; and so on. First-tier slave node 523a would take over as the first-tier master node if 10 milliseconds elapses without it receiving any proper first-tier master-control signals; the next first-tier slave node 523b would take over as the first-tier master node if 20 milliseconds elapses without it receiving any proper first-tier master-control signals; the next first-tier slave node 523c would take over as the first-tier master node if 30 milliseconds elapses without it receiving any proper first-tier master-control signals; and so on.

Use of 10 millisecond increments for the wait periods in the above example is considered merely illustrative, and the actual wait periods should be selected depending upon the time criticality of the control messages, and the number of messages that may be missed before a high enough degree of certainty is established that the master node has failed. For example, if a slave node expects to observe a control-message signal on the data bus no later than every 5 milliseconds, then the slave node may be programmed to assert a failure mode condition after a wait period corresponding to the absence of a predefined number of messages—for example, twenty messages (i.e., 100 milliseconds). If critical aspects of the system requiring master node control need to be serviced in a shorter time period, then the wait period would have to be reduced to accommodate the time-sensitive components of the system.

The order in which the slave nodes take over for the master node need not be dictated by the relative position in the control loop of the slave node with respect to the master node, but rather may be dictated according to the programmed wait period in each slave node. Flexibility is thereby provided in the order of priority in which the slave nodes take over for the master node in the event of a failure event.

Accordingly, by use of the inventive techniques described herein, redundant backup for the first-tier master node 503 is provided. Such redundant backup control is provided without requiring additional physical nodes to be located within the control system, and without having to provide wiring for such additional physical nodes to the buses 504 or 513. The redundant backup for the master node 504 is also accomplished while resolving contention problems that might otherwise occur if each of the first-tier slave nodes 523 were programmed with the identical timeout period.

In a preferred embodiment, redundant backup control is provided in a similar manner for the secondary data bus 513, and each additional data bus that may be provided in the system. Thus, each of the second-tier slave nodes 533 is preferably configured with the circuitry shown for node 603 in FIG. 6, and each of the second-tier slave nodes 533 can therefore substitute itself for the first-tier slave/second-tier master node 523c if the first-tier slave/second-tier master node 523c fails.

If a particular node is operating as a master node for two buses as a result of a failure of the master node on a higher-tier bus, and the node operating as such fails, then it is possible that two different nodes will take over for the failed node, one node taking over on each bus. For example, supposing that first-tier slave/second-tier master node 523c has already taken over as the first-tier master node due to a failure of the master node 503, and further suppose that first-tier slave/second-tier master node 523c too fails, then the next first-tier slave node 523d would take over as the first-tier master node with respect to the main data bus 504, but the first second-tier slave node 533a would take over as second-tier master node with respect to the secondary data bus 513.

In the above manner, despite the failure of one or more nodes, substantial functionality of the control system as a whole can be maintained. A failed node is essentially discarded or bypassed to the extent possible so as to maintain the highest possible degree of continued operability. Furthermore, because certain parts of the system will continue operate despite the failure of the master node, identification of the failed node by engineers or maintenance personnel should be simplified by being able to identify the inoperative portion of the system that has become isolated due to the failure.

In one aspect, separation of responsibility in each node 603 of master functions and slave functions between two different CPU's each operating with a different transceiver allows the node 603 to potentially continue operating as either a master node or a slave node should one of the CPU's fail, providing that the failure does not disrupt both of the transceivers at the node 603.

The invention provides in another aspect a mechanism and method for automatically locating a fault (e.g., an open or short circuit) occurring on one of the buses, isolating the fault, and continuing operation while maintaining the isolated state of the fault. The mechanism and method for automatically locating and isolating a fault can be used separately from or in conjunction with the techniques described previously for redundant backup master control of the network.

Figure 7A:
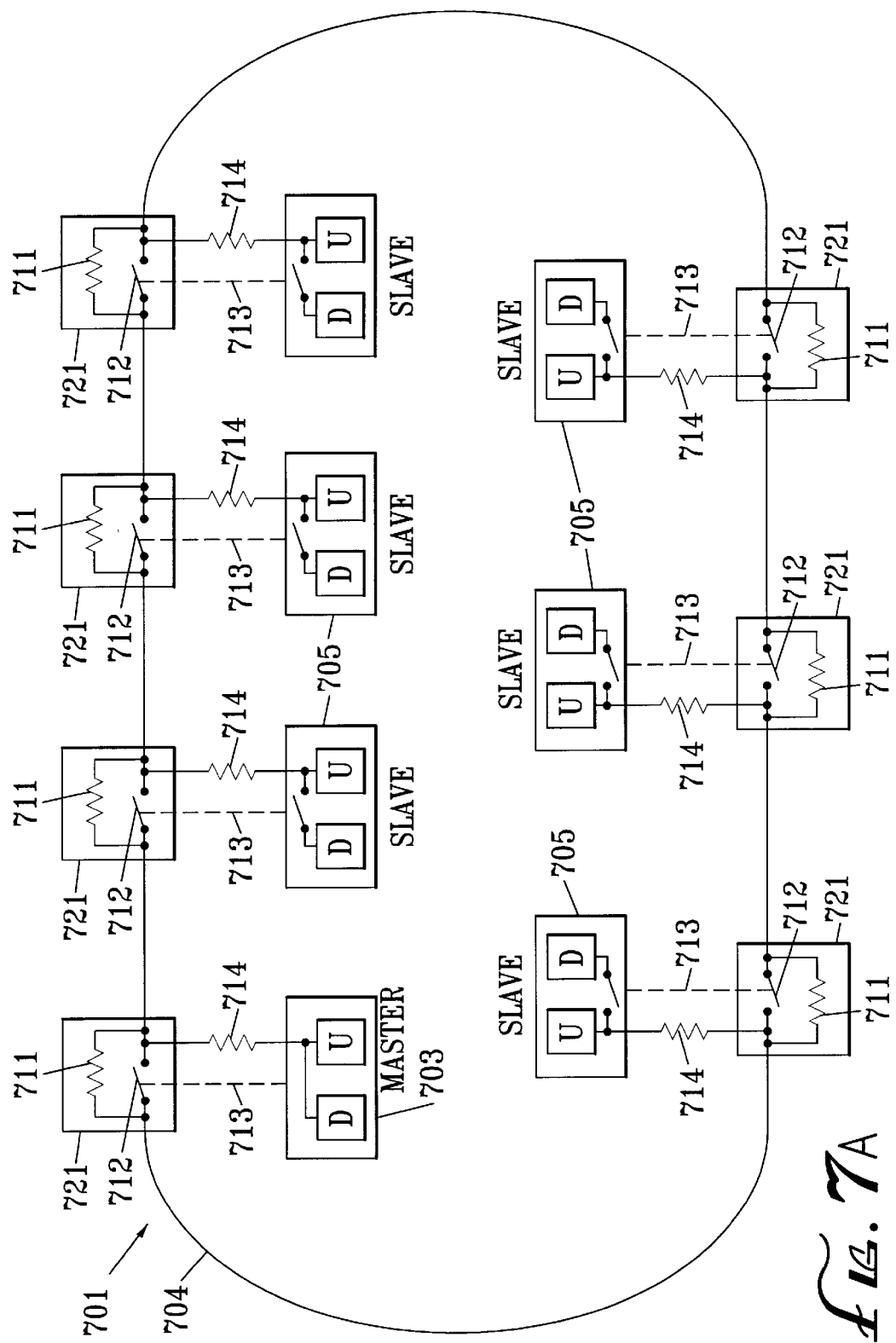
FIG. 7A is a diagram of a control network in accordance with one embodiment of the invention for automatically locating and isolating faults.

Referring now to FIG. 7A, a portion of a control network 701 is shown comprising circuitry for locating and isolating a fault as may occur on a bus 704 of the control network 701. Only one bus 704 is shown in FIG. 7A; however, the same principles as will be described for the portion of the control network 701 shown in FIG. 7A are applicable to other buses of the control network as well, no matter at which level or sub-level the bus is located.

The control network 701 of FIG. 7A comprises a master node 703 and a plurality of slave nodes 705 (in this example, six slave nodes 705). The master node 703 and each of the slave nodes 705 are preferably configured in accordance with the illustration of a preferred node shown in FIG. 6. The master node 703 and slave nodes 705 shown in FIG. 7A are each preferably configured with a shunt circuit 721, shown in more detail in FIG. 6 as shunt circuit 642. The shunt circuit 642 comprises a pair of resistors 643a, 643b, each of which is configured in parallel circuit connection with a pair of switches 644a, 644b, respectively. The switches 644a, 644b (which may each comprise, for example, a relay or a FET transistor, or any other suitable switching means) operate under the control of the node 603. In a preferred embodiment, the switches 644a, 644b operate under the control of the CPU 612 connected to the uplink transceiver 611.

The shunt circuit 642 is positioned in the path of the bus 604 such that the pair of bus signal lines 641a, 641b passes in one end of the shunt circuit 642 and exits the other end. Signal lines 641a, 641b are each connected to the uplink transceiver 611 through a resistor (shown as resistor 714 in FIG. 7A) to protect the uplink transceiver 611 in case of a short circuit on the bus 604. In normal operation, switches 644a, 644b remain in the closed position, such that signals may propagate freely over the signal lines 641a, 641b, and the resistors 643a, 643b are bypassed. However, under certain fault conditions the switches 644a, 644b may be opened as described further herein.

Figure 7B:
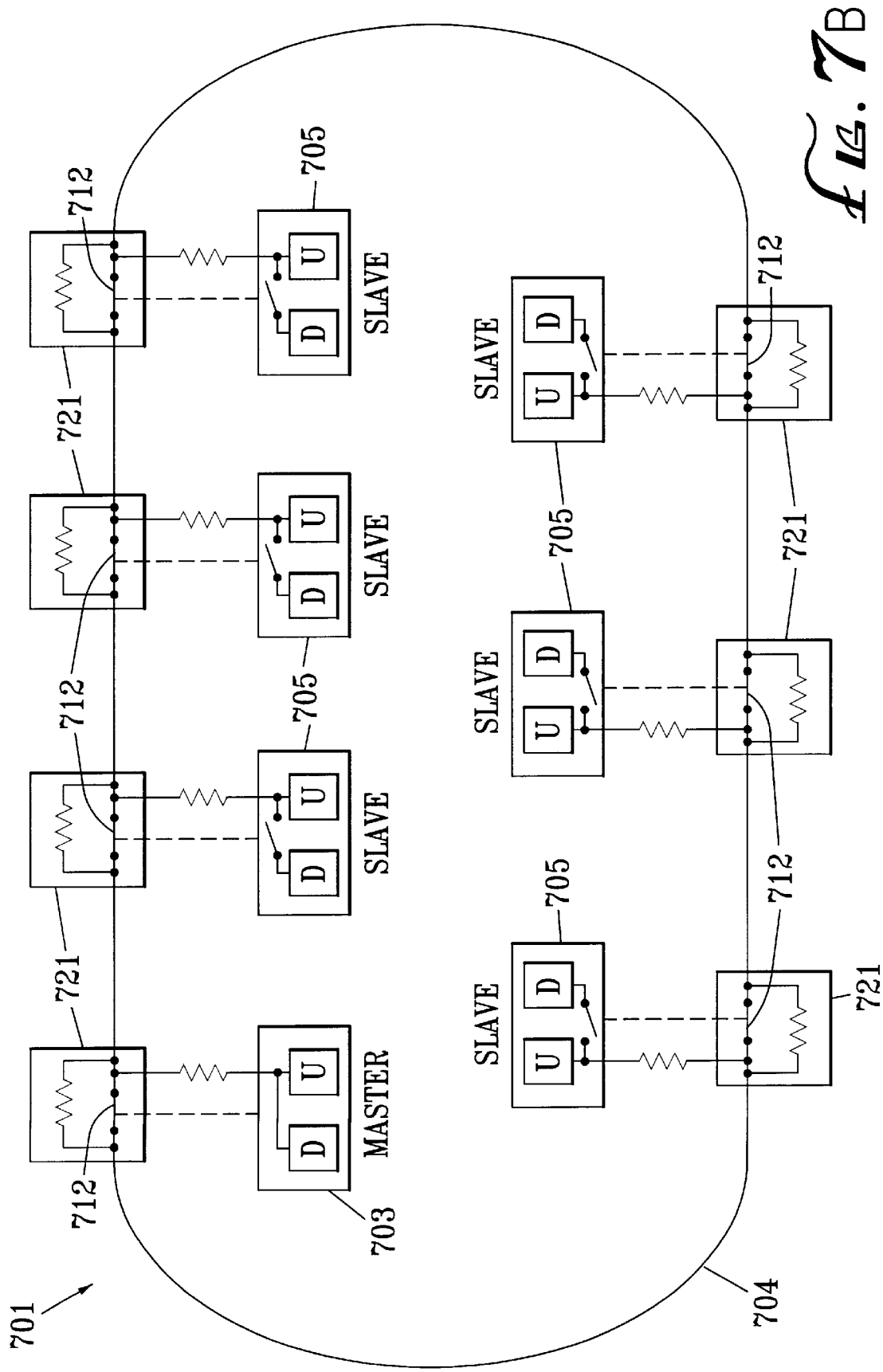
FIG. 7B is a diagram of the control network of FIG. 7A with relays at each node shown in a closed state for normal operation.

FIG. 7B depicts the control network 701 in its state of normal operation, with all of the switches 714 in a closed position for the master node 703 and all of the slave nodes 705. While only a single line is drawn for the bus 704 in FIGS. 7A and 7B, it is to be understood that the bus may comprise multiple wires (e.g., bus 704 may comprise a twisted pair of wires such as signal lines 641a, 641b as well as a pair of power wires). Similarly, only a single switch 712 is shown for each shunt circuit 721 in FIG. 7A, but switch 712 is representative of both switches 644a and 644b appearing in FIG. 6.

FIGS. 8A through 8G depict operation of the control network 701 in the situation where a fault condition occurs. The operation of the control network 701 will be explained with reference to FIGS. 9 and 10, which are process flow diagrams for the master node 703 and slave nodes 705, respectively.

Figure 8A:
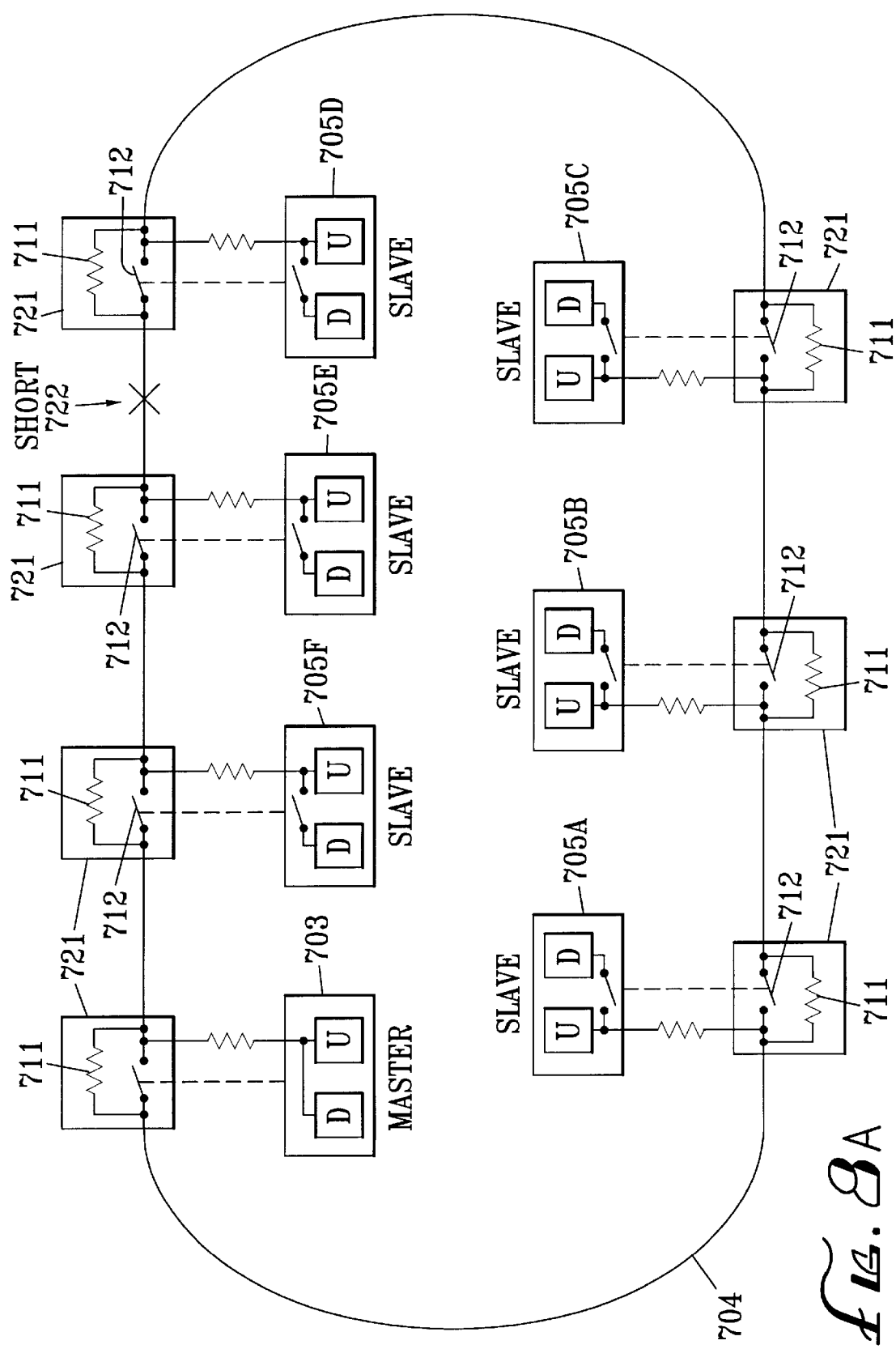
FIGS. 8A through 8G are diagrams illustrating a preferred method for automatically locating and isolating a fault.

When a fault such as a short circuit 722 shown in FIG. 8A occurs, the effect is typically to prevent communication over the bus 704 and essentially bring the operation of the control network 701 to a halt. The master node 703 and each slave node 705 is preferably equipped with a means for detecting the occurrence of a fault. While a global fault detection circuit may in some embodiments be provided, with the global fault detection circuit connected to each of the master node 703 and slave nodes 703, it is preferred that each of the master node 703 and slave nodes 705 has its own local fault detection means.

In a preferred embodiment, each of the master node 703 and slave nodes 705 monitor communications over the bus 704 to which they are connected. Each slave node 705 monitors even those communications which are not specifically targeted to it. The slave node 705 preferably maintains a timer (such as timer 613 shown in FIG. 6) which is periodically reset when a communication is detected, in a manner similar to described previously for the redundant backup control. When the timer times out, indicating a communication has not been detected on the bus 704 for a predetermined amount of time, a fault detection condition is determined to exist, and each of the master node 703 and slave nodes 705 responds accordingly.

The first step of the response is for each of the master node 703 and slave nodes 705 to open its respective switch 712, causing the bus 704 to be fragmented and preventing any communication among nodes. This step is the same for both the master node 703 and the slave nodes 705. Each of the master node 703 and slave nodes 705 are thereby isolated from one another, except for the shunt resistor 711 which remains between each pair of adjacent nodes when the switches 712 are opened.

The procedure then differs for the master node 703 and the slave nodes 705. Generally, the slave nodes 705 await instruction from the master node 703, each slave node 705 being accessed in turn until a slave node 705 fails to respond and the fault is thereby located. Each slave node 705 opens its switch in turn, under control of the master node 703, until the fault is located.

Figure 9:
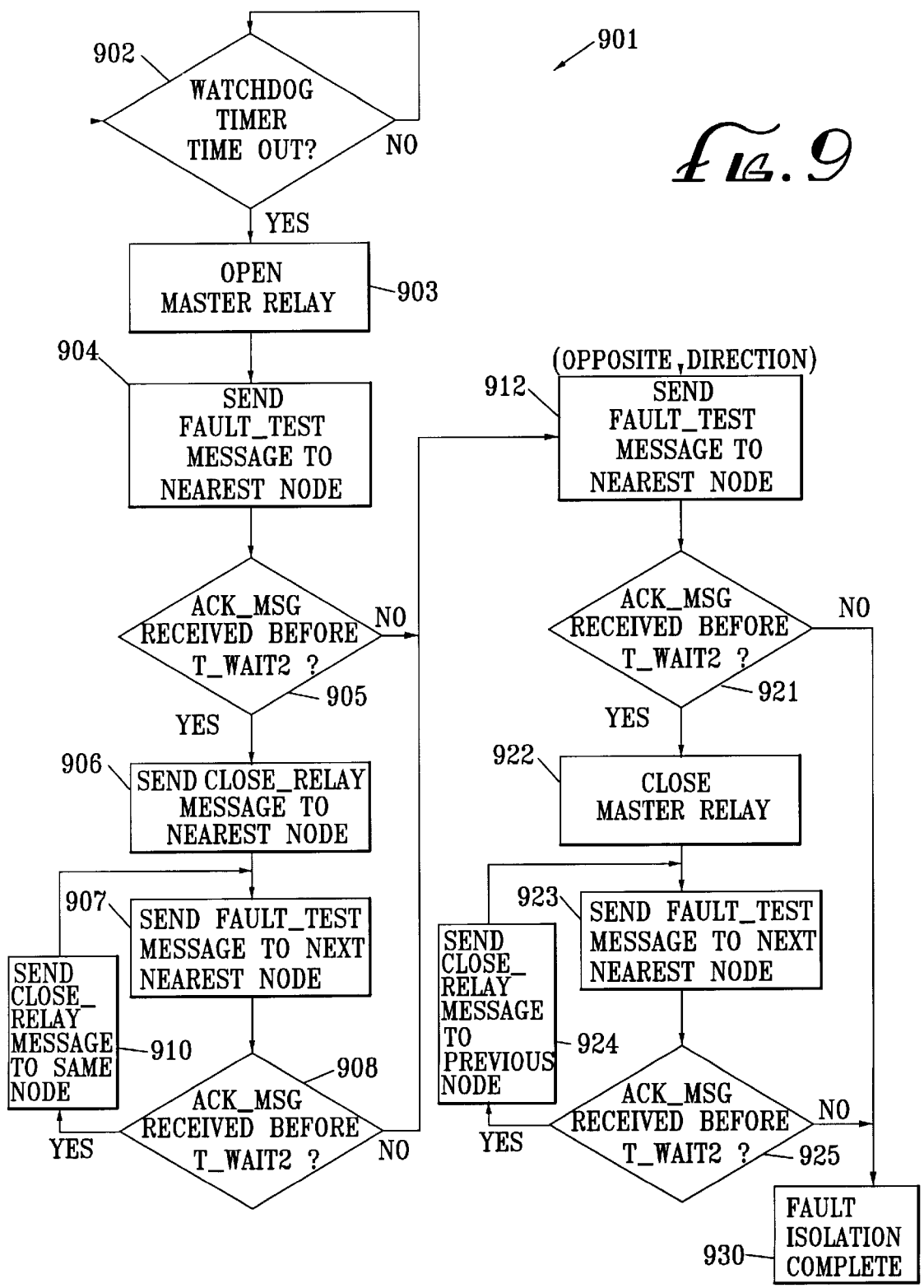
FIG. 9 is a preferred process flow diagram for a master node to handle a potential fault.

The steps undertaken by the master node 703 are illustrated in the process flow diagram of FIG. 9. In the first step 902 shown in FIG. 9, as already explained, a fault detection condition is determined when the watchdog timer of the master node 705 times out. So long as the watchdog timer has not timed out, the process stays at step 902, which would be considered the normal operating state. When the watchdog timer times out, the process branches to step 903, at which point the master node 703 opens its switch 712, as shown in FIG. 8A.

At a next step 904, after a predetermined wait period T_WAIT1 which is selected as long enough to ensure that all of the slave nodes 705 have had an opportunity to detect the fault and open their switches 712, the master node 703 sends a FAULT_TEST command message to the nearest slave node 705. Preferably, the master node 703 is programmed not only with the identities (i.e., node identification numbers) but also the physical proximity of each slave node 705 with respect to the master node 703. The master node 703 thereby has information as to the ordering of the specific slave nodes 705 in each direction (i.e., both "forward" and "backward", or "clockwise" and "counter-clockwise", in the loop). In the example of FIGS. 8A through 8G, the master node 703 would be programmed with information that the first slave node 705 in a "clockwise" (or "forward") direction is slave node 705f, the next slave node 705 in that direction is slave node 705e, and so on until the end of the loop; likewise, the master node 703 would be programmed with information that the first slave node 705 in a "counter-clockwise" (or "backward") direction is slave node 705a, the next slave node 705 in that direction is slave node 705b, and so on until the end of the loop.

Figure 8B:
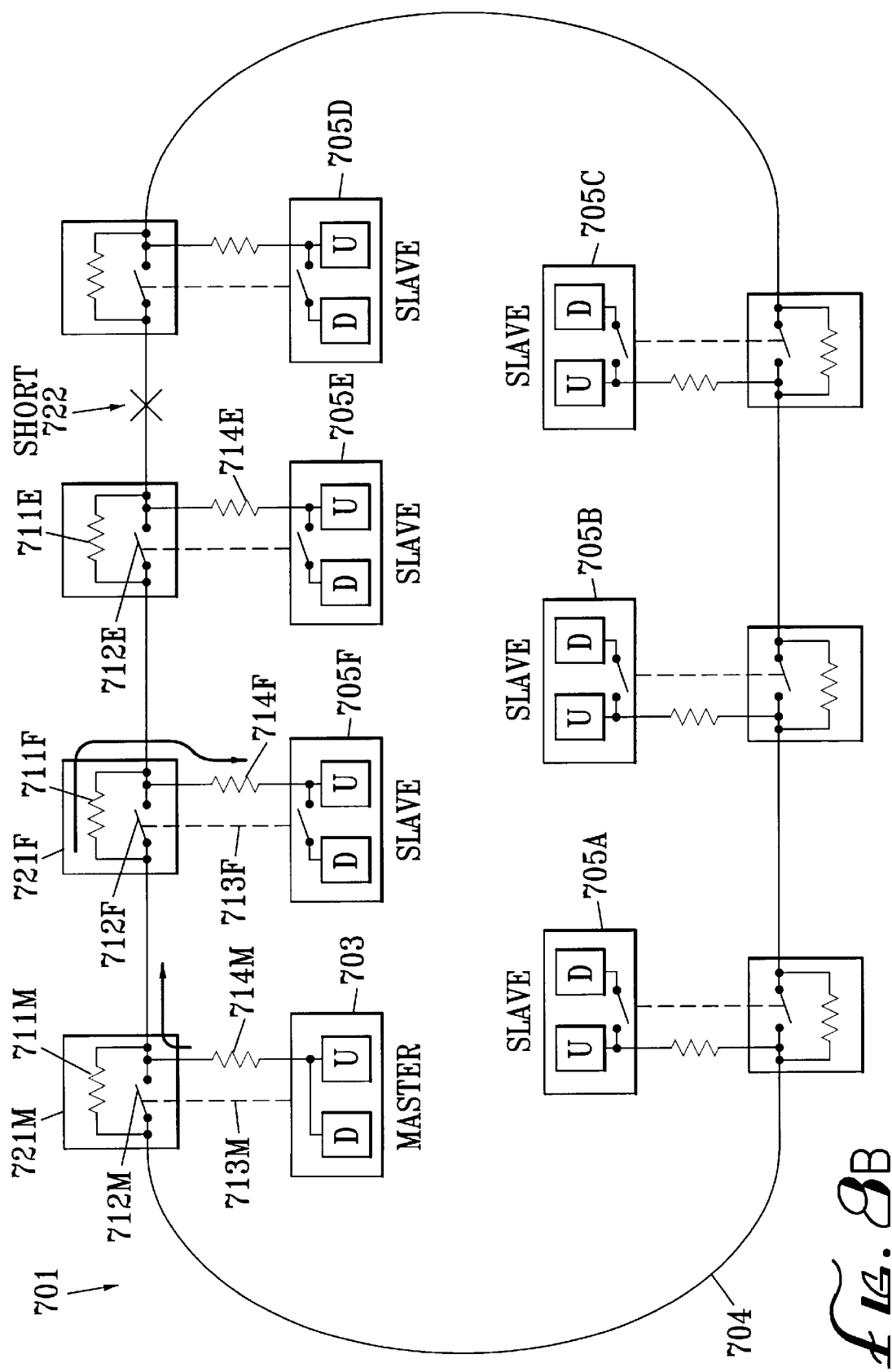

Thus, in the example of FIG. 8B, the master node 703 sends a FAULT_TEST command message directed to slave node 705f (alternatively, the master node 703 could start with the other direction, and send a message first to slave node 705a). If the fault has occurred on the portion of the bus 704 between the master node 703 and the first slave node 705f, then the first slave node 705f will not receive the message. The master node 703 will therefore not receive a response from the first slave node 705f, and may make an attempt to reach other slave nodes 705. If no response is received from any of the slave nodes 705, it may be assumed that the fault has occurred on the portion of the bus 704 connected directly to the master node 703, and the master node 703 will be essentially locked out of communication with the slave nodes 705. In this situation, one of the slave nodes would take over for the master node 703, using similar techniques as described previously herein. This particular situation is described in further detail hereinafter.

If, however, the first slave node 705f receives the FAULT_TEST message, then it will send a suitable response to the master node 703. The response of the slave node 705f may be explained with reference to FIG. 10, which illustrates the process flow for each of the slave nodes 705. In the first step 952 shown in FIG. 10, as already explained, a fault detection condition is determined when the watchdog timer of the slave node 705f times out. So long as the watchdog timer has not timed out, the process stays at step 952, which would be considered the normal operating state. When the watchdog timer times out, the process branches to step 953, at which point the slave node 705f opens its switch 712f, as shown in FIG. 8A. The slave node 705f then cycles at step 954, awaiting a command from the master node 703 for the slave node 705f to close its switch 712f or otherwise take action.

Figure 10:
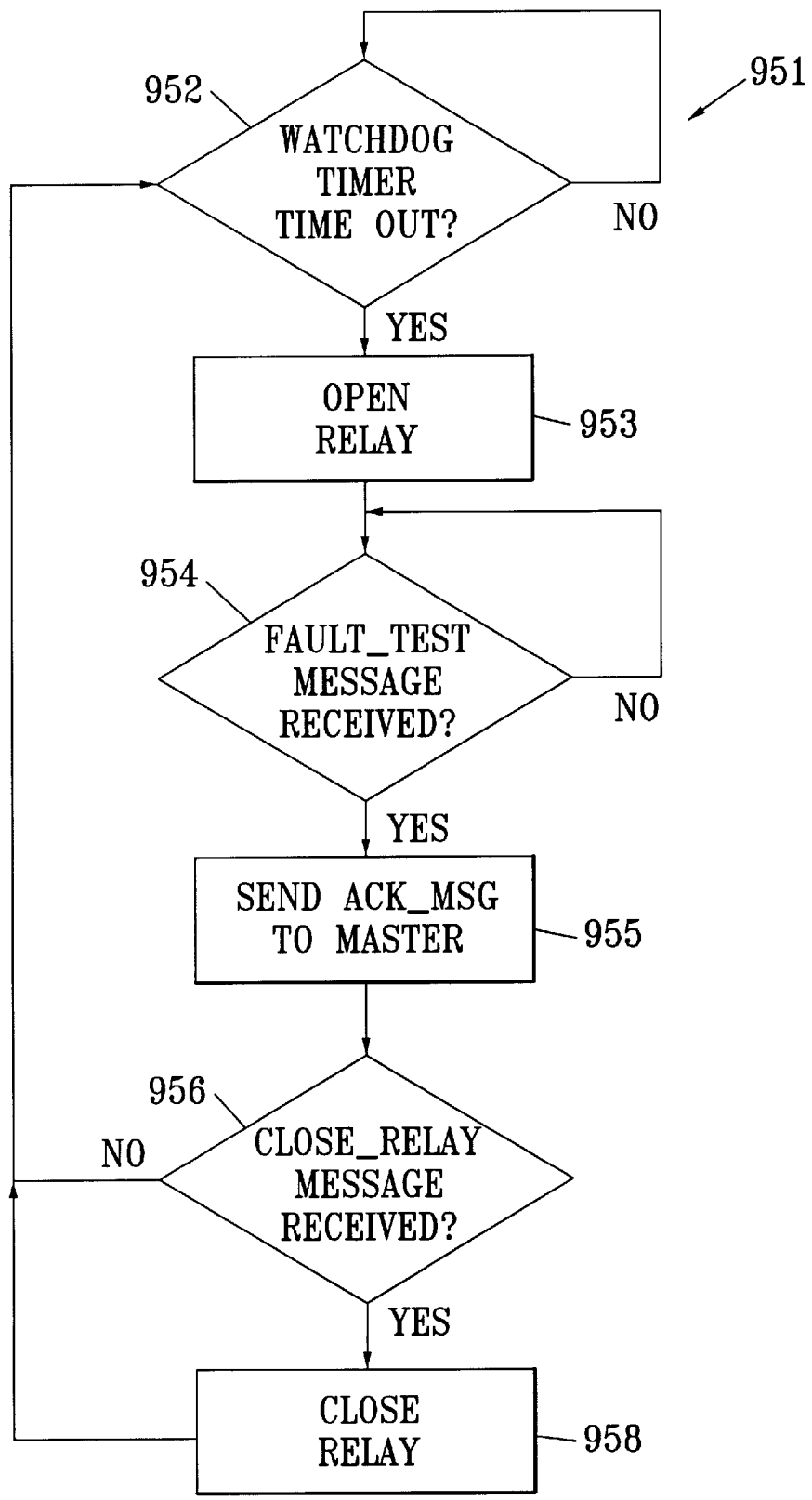
FIG. 10 is a preferred process flow diagram for a slave node to handle a potential fault.

When the master node 703 sends the FAULT_TEST command message in step 905 of the FIG. 9 process flow, the slave node process flow shown in FIG. 10 branches to step 955, at which point the slave node 705f sends an acknowledgment message to the master node 703. After sending the acknowledgment message, the slave node 705f does not yet close its switch 712f, but instead waits for a command from the master node 703 to instruct it to do so at a later point.

If the FAULT_TEST command message was received by the slave node 705f, then the master node 703 should receive the acknowledgment message within the predetermined time period T_WAIT2. The process of FIG. 9 therefore branches to the next step 906 and at that point, without yet closing its own switch 712m (e.g., relay), sends a CLOSE_RELAY command message to the first slave node 705f. The purpose of doing so is to allow the to allow the master node 703 to communicate with the next slave node 705e in the forward direction of the bus 704. The master node 703 will eventually communicate with each slave node 705 in series until the location of the fault is identified. To effectuate this protocol, suitable values of resistors 711 must be selected. Preferably, the impedances of resistors 711 are selected so that messages on the bus 704 can propagate through at most only one of the resistors 711 to reach the immediately adjacent slave node 705. By selecting impedances in this manner, a short circuit on the bus 704 will prevent communication only on a limited portion of the bus 704, but will not totally disrupt communication on all portions of the bus 704.

Because in this example, the first slave node 705f successfully received the FAULT_TEST command message, it may be assumed that the first slave node 705f will also successfully receive the CLOSE_RELAY command message. At this point it is known that the fault does not lie on the portion of the bus 704 between the master node 703 and the open switch 712e of the next slave node 705e, because otherwise the master node 703 would not have been able to communicate with the first slave node 705f. In response to receiving the CLOSE_RELAY command message, as shown in FIG. 10, the first slave node 712f closes its relay at step 958 and returns to its normal operating mode. If the first slave node 705f does not receive the CLOSE_RELAY command message right away, it may return to its normal operating mode, but may receive a CLOSE_RELAY command message at some point in the future if circumstances so warrant.

Figure 8C:
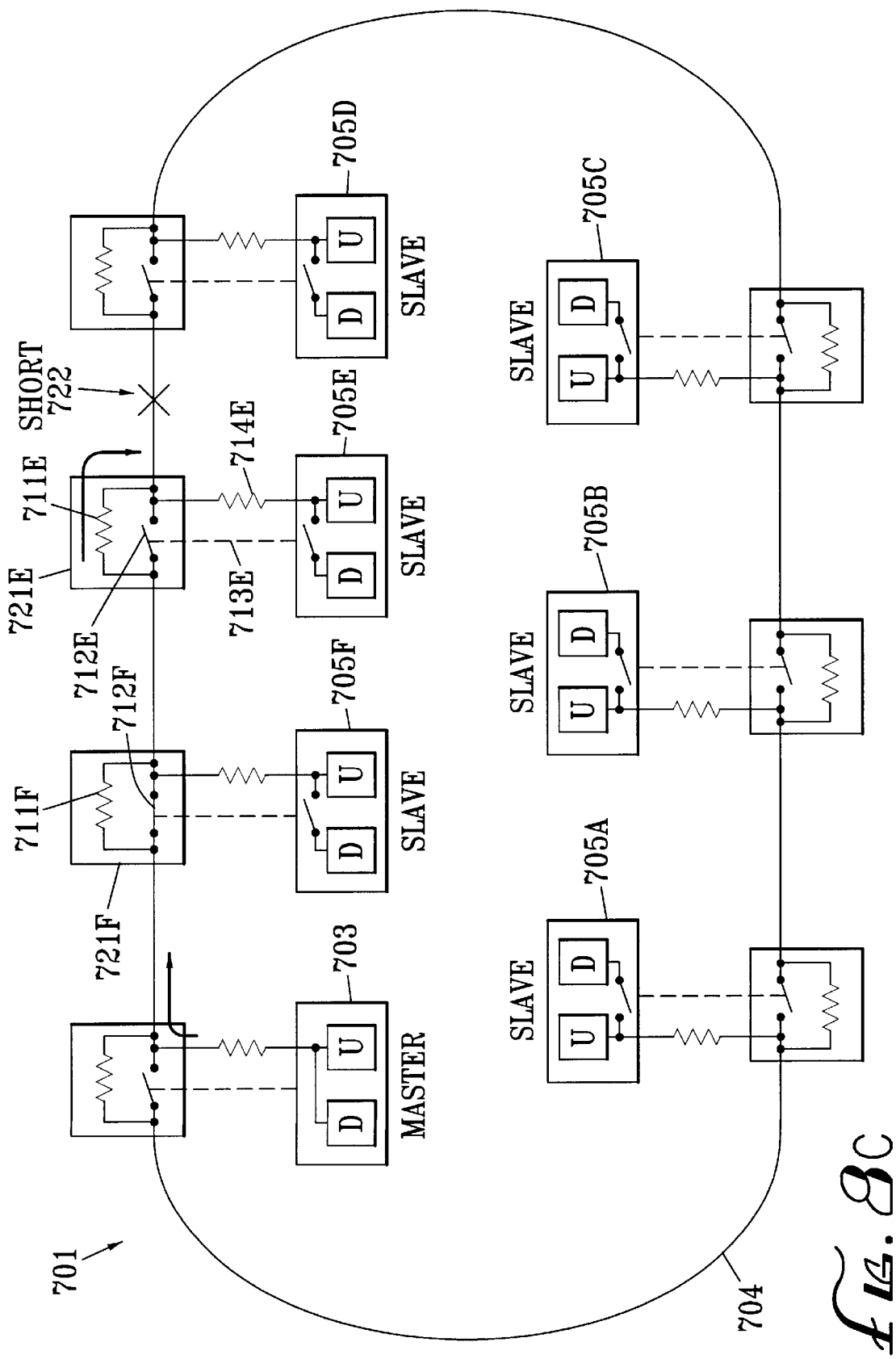

At a next step 907 in the flow control diagram of FIG. 9, after a delay sufficient to allow the first slave node 705f to close its switch 712f, the master node 703 sends a FAULT_TEST command message targeted to the next slave node 705e in the loop. The FAULT_TEST command message will travel across the closed switch 712f of the first slave node 705f, as shown in FIG. 8C. However, since the fault has occurred on the portion of the bus 704 located between the second slave node 705e and the third slave node 705d, the FAULT_TEST command message will not reach the second slave node 705e. The master node 703 will therefore receive no response from the second slave node 705e and, as a result of the master node 703 failing to receive a response within the predefined time period T_WAIT2 (shown in step 908), the process of FIG. 9 will branch to the next step 912. At this point, having failed to receive a response from the second slave node 705e, the master node 703 has determined that a fault lies at some point beyond the resistor 711e of the second slave node 705e. The fault isolation process then continues as described below.

If, on the other hand, the fault had not occurred on the portion of the bus 704 located between the second slave node 705e and the third slave node 705d, then the second slave node 705e would have received the FAULT_TEST command message and responded to it in a manner similar to the first slave node 705f, according to the process flow diagram of FIG. 10. As with the first slave node 705f, the second slave node 705e would have sent an acknowledgment message to the master node 703, and thereafter been instructed by the master node 703 to open its switch 705e. This process would have repeated sequentially with each slave node 705 in the loop until the potential fault location was identified (i.e., until a slave node 705 fails to respond), causing the process to move to step 912.

Figure 8D:
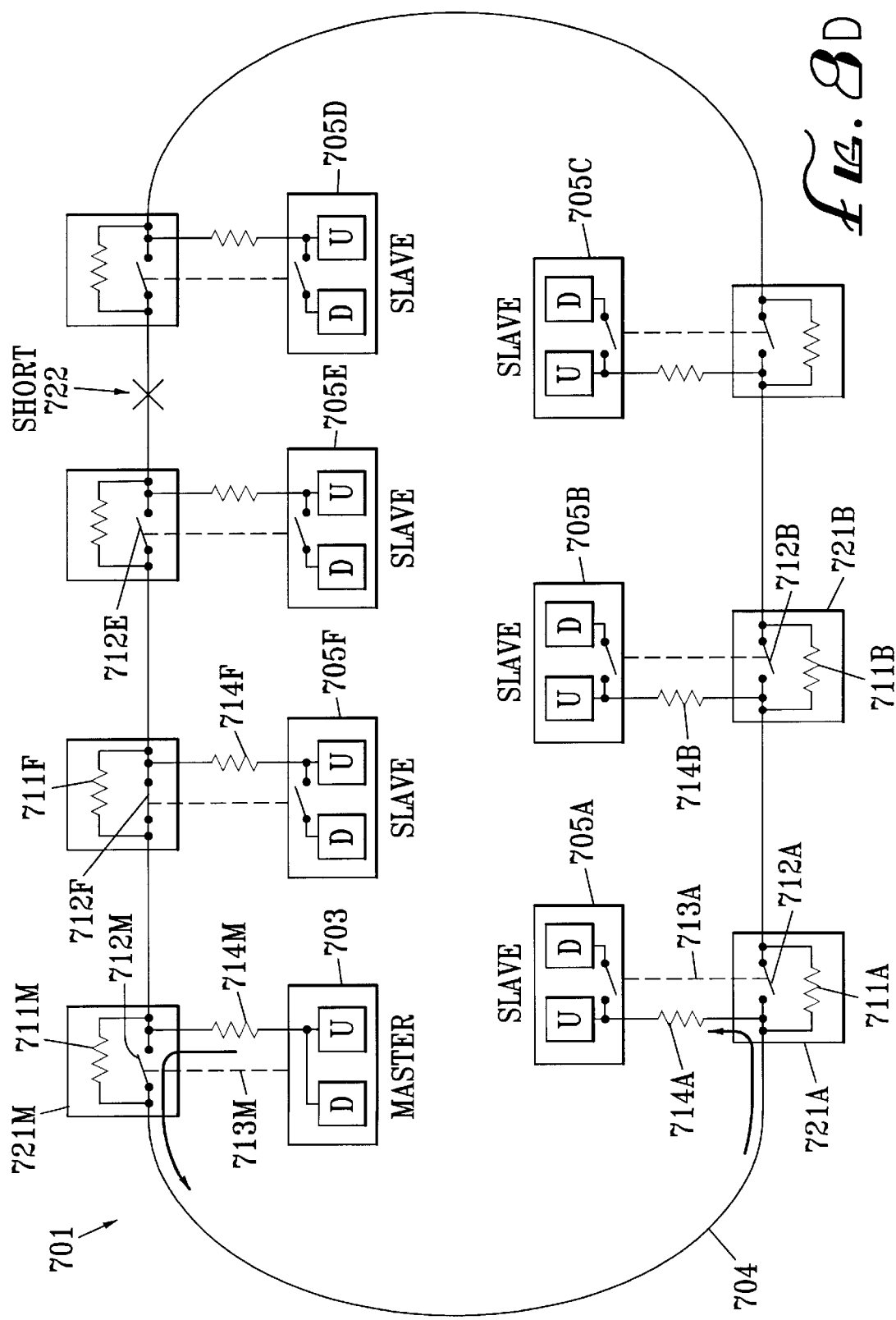

When the master node 703 reaches step 912 of the process flow in FIG. 9, it has reached the last slave node 705 which is capable of responding, in one of the two directions of the loop. The master node 703 then repeats the process in the opposite direction of the loop. Accordingly, in step 912, and as illustrated in FIG. 8D, the master node 703 sends a FAULT_TEST command message to the first node 705a in the other direction (i.e., the "counter-clockwise" or "backward" direction) of the loop. The FAULT_TEST command message propagates through resistor 711m and 714a to reach slave node 705a. Slave node 705a responds in a manner similar to slave nodes 705f, and, having successfully received the FAULT_TEST command message, returns an acknowledgment message to the master node 703.

If the master node 703 receives the acknowledgement message within the predefined wait period T_WAIT2, as tested in step 921 of FIG. 9, then it responds in the next step 922 by closing the master switch 712m (e.g., relay). At this point, the master node 703 has determined that the fault condition does not lie on the portion of the bus 704 between the master node 703 and the open switch 712a of slave node 705a. If the master node did not receive an acknowledgment message in step 921, then the process would move to step 930, and the master node 703 would operate thereafter with its switch 712m in an open state, under the assumption that a fault condition occurred on the portion of the bus 704 between the master node 704 and the slave node 705a.

Figure 8E:
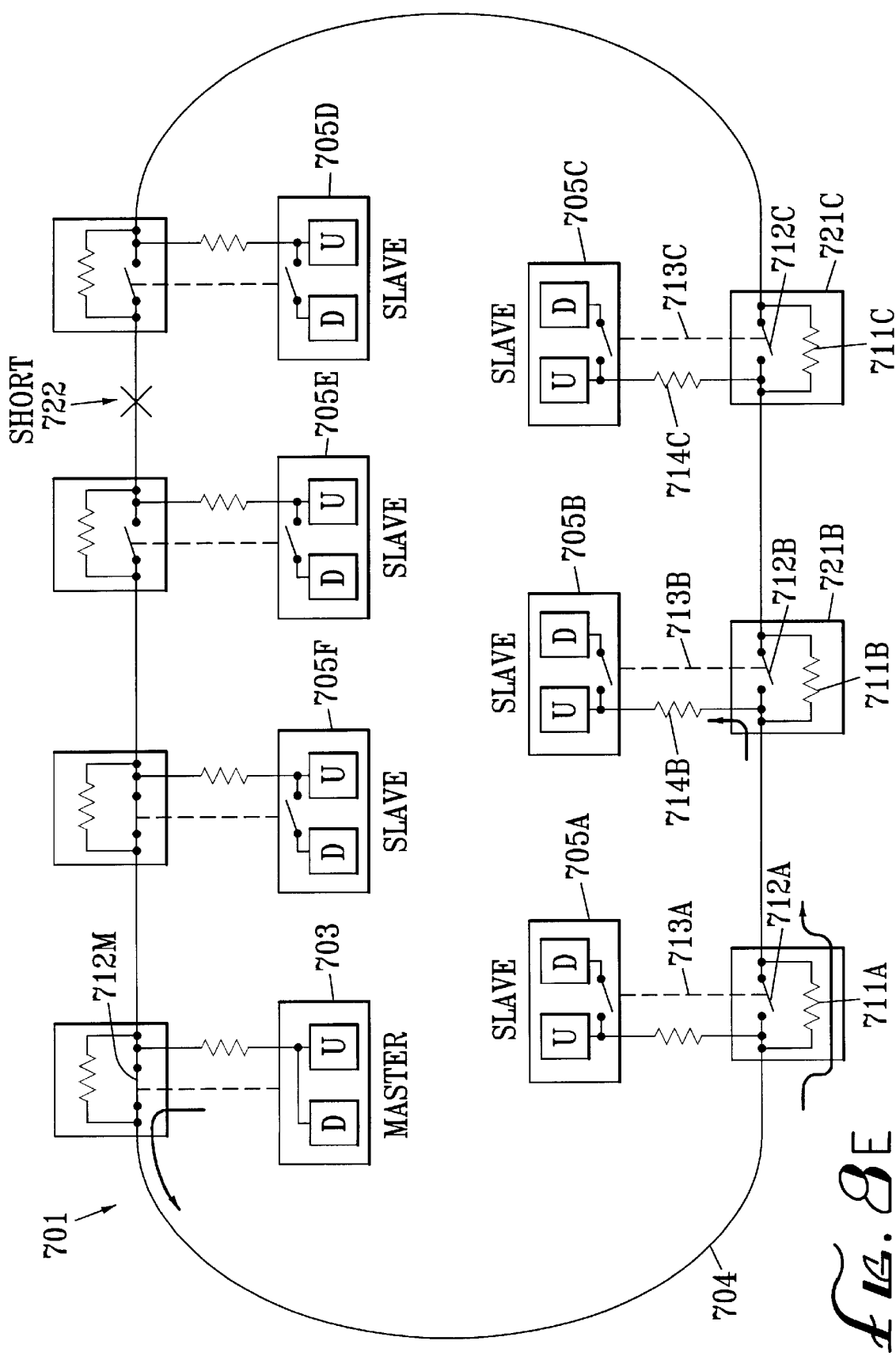

Having received the acknowledgment message from slave node 705a and instructed the slave node 705a to open its switch 712a, the master node 703 sends a FAULT_TEST command message targeted to the next slave node 705b in the "counter-clockwise" direction of the loop. As shown in FIG. 8E, the FAULT_TEST command message propagates through resistors 711a and 714b (as switch 712a remains open) and reaches the next slave node 705b. In accordance with the process flow of FIG. 10, the slave node 705b node responds with an acknowledgment message to the master node 703. If the master node 703 receives the acknowledgment message within the predefined wait period T_WAIT2, as tested in step 925, it then instructs the previous slave node 705a to close its switch 712a, having determined that the fault does not lie on the portion of the bus 704 between the two slave nodes 705a and 705b.

Figure 8F:
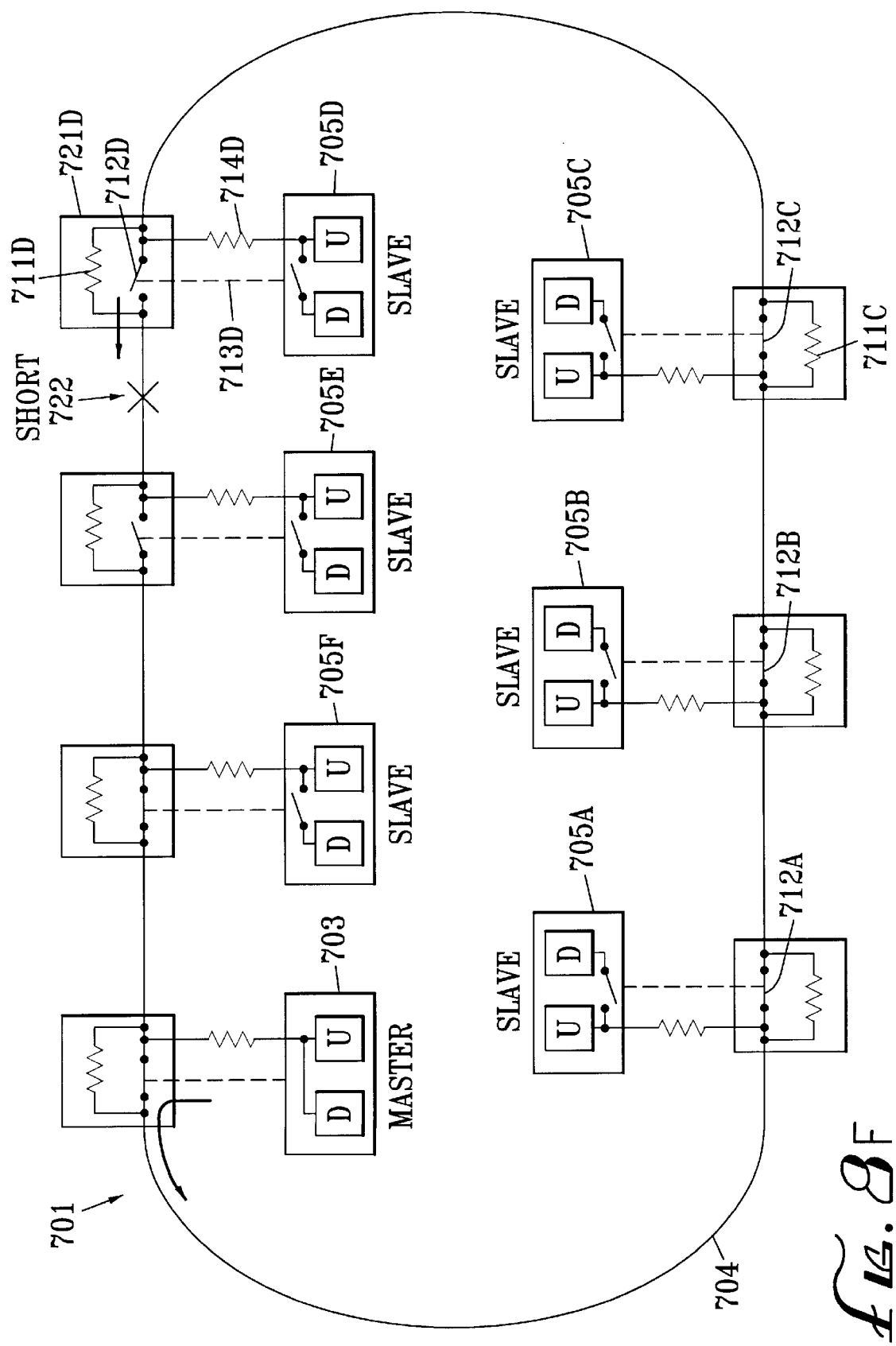

The same process will be repeated for each of the following slave nodes 705, until the master node 703 fails to receive an acknowledgment message. FIG. 8F illustrates the situation after several more cycles, at which point switches 712a, 712b and 712c of slave nodes 705a, 705b and 705c, respectively, have all been closed. Prior to slave node 705d closing its switch 712d, the master node 703 could communicate with each of slave nodes 705a, 705b and 705c over bus 704, the short circuit 722 being isolated due to the combined effect of resistor 711d and the open switch 712d. However, if slave node 705d were to close its switch 712d, the short circuit 722 would ground the bus 704, preventing the master node 703 from communicating over the entire bus 704.

Assuming that the master node 703 has sent a FAULT_TEST message to slave node 705d and recently received an acknowledgment message from slave node 705d, the master node 703 then sends a CLOSE_RELAY message to the previous slave node 705c. In the next step 923, after a short delay period allowing slave node 705c to close its switch 712c, the master node 703 sends a FAULT_TEST command message targeted to the next slave node 705e in the loop that has not yet returned an acknowledgment message. However, the FAULT_TEST command message will not reach slave node 705e due to the short circuit 722. As a result, as illustrated in the process flow of FIG. 9, operation of the master node 703 will branch from step 925 to step 930 after a predetermined time period T_WAIT2 is timed out.

The master node 703 has at this point determined that a fault condition exists over bus 704 beyond slave node 705d. By combining this knowledge with the information obtained from cycling through the slave nodes 705 in the clockwise direction, the master node 703 can determine that the fault condition 722 exists at the portion of the bus 704 located between slave nodes 705d and 705e. The master node 703 will not instruct the slave node 705d to close its switch, thereby keeping the short circuit 722 in isolation from the rest of the bus 704. At this point, the fault isolation process is considered complete, and normal operation can resume.

Figure 8G:
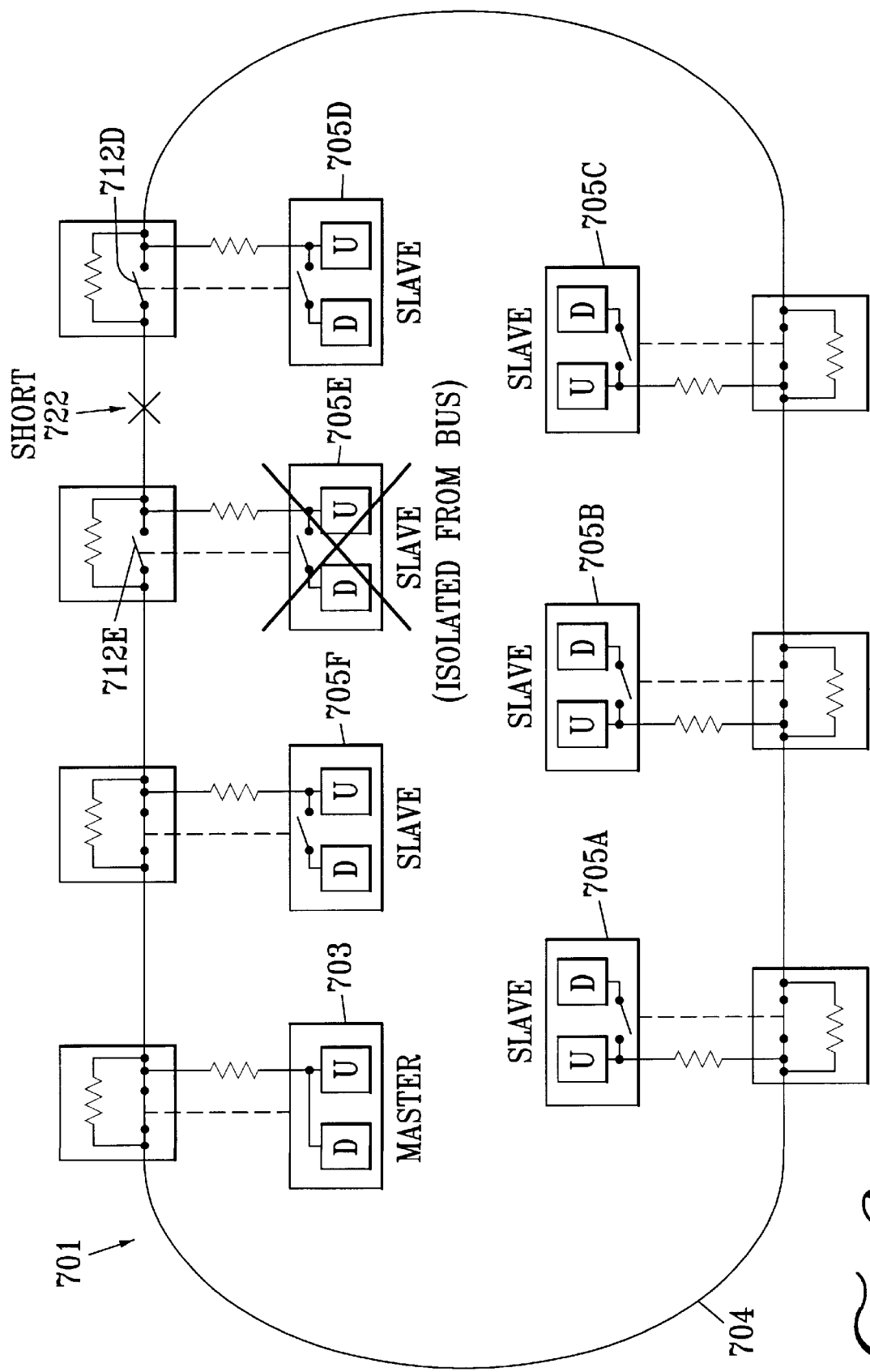

FIG. 8G shows the situation after the fault location and isolation process has been completed. The switch 712m of master node 703 and the switches 712a, 712b, 712c and 712f of slave nodes 705a, 705b, 705c and 705f, respectively, are each in a closed position, with the switches 712d and 712e of slave node 705d and 705e, respectively, remaining open. The short circuit 722 is thereby isolated between the open switches of slave nodes 705d and 705e. The system continues to operate, but due to the effect of the short circuit 722, slave node 705e remains inaccessible until the short circuit is repaired. However, substantial functionality of the system is maintained.

For the process to work properly, suitable values for the shunt resistors 711 of each of the slave nodes 705 must be selected. If the resistance for shunt resistors 711 is too large, then signals will not be able to reach the slave nodes 705. If the resistance is too small, then too much current may be diverted to the short circuit 722, again preventing communication signals from reaching the target slave node 705. A value for the shunt resistor 711 is preferably selected such that signals from the master node 703 will propagate through no more than one of the shunt resistors 711 if the shunt resistors are placed in series, assuming the short circuit protection resistors 714 are much smaller in value than the shunt resistors 711.

The system may be optimized such that the values of shunt resistors 711 are adjusted according to the resistance of the bus cable lines connecting the various slave nodes 705 and master node 703. To make such adjustment easier, the shunt resistors 711 may be made adjustable through dip switches or may be embodied as potentiometers. Alternatively, the shunt resistors 711 may be programmable, and may take the form of a programmable resistive ladder array. It will also be appreciated by those skilled in the art that shunt resistors 711 may comprise any material or component, or set of components, that provides the appropriate impedance effect.

It is possible that a short circuit will occur at the master node 703 or on the portion of the bus 704 that links the master node 703 to the remainder of the system. For example, a short circuit may occur on the portion of the bus 704 between the master node 703 and the last slave node 705f. If a short circuit occurs at such a location, it may prevent the master node 703 from communicating with the slave nodes 705 regardless of whether or not the master node 703 opens its switch 712m. If this situation occurs, then no messages will be communicated on the bus after a fault detection, because of the slave nodes 705 will be waiting for the master node 703 to contact them. To prevent a lockup of the system, a master-fault wait period is established, such that one of the slave nodes 705 takes over as a backup master, in accordance with the redundant backup master control scheme described earlier. The master-fault wait period is preferably longer than the longest amount of time it would take for the master node 703 to otherwise contact all of the slave nodes 703 after a fault. Upon taking over, the backup master node will follow the same process shown in FIG. 9 for locating and isolating the fault.

The process of locating and isolating a fault may thereby be operated in combination with the mechanism for providing redundant backup control, as described previously herein.

After determining the location of a fault, the master node 703 may store this information, which may be read out by engineering or maintenance personnel for the purpose of assisting them to rapidly diagnose and repair the defective portion of the bus 704. A substantial time savings in locating the fault may therefore be achieved.

It will be appreciated by those skilled in the art that there are many variations to the precise protocol for locating and isolating a fault. Such variations would be apparent to one skilled in the art after perusal of the specification and drawings herein.

The invention in one aspect provides a method for fault isolation and recovery, the steps of the method comprising the steps of (a) detecting a fault condition; (b) isolating each node from its adjacent nodes except for an impedance between each node and its adjacent nodes; (c) transmitting a fault test message from the master node to the nearest isolated slave node with respect to the master node; (d) receiving the fault test message at the nearest isolated slave node unless the fault condition prevents receipt of the fault test message; (e) sending an acknowledgment message from the slave node to the master node; (f) de-isolating the nearest isolated slave node in response to receiving an acknowledgment message from the nearest isolated slave node; and (g) repeating steps (c) through (f) until a nearest isolated slave node fails to receive the fault test control message due to the fault condition. The method may be repeated in the other direction of the loop as well.

In another aspect of the invention, de-isolation of slave nodes in one direction of the bus is accomplished by instructing each slave node receiving an acknowledgment message to close a controllable switch connecting two portions of the data bus together, and de-isolation of slave nodes in the other direction of the loop is accomplished by instructing the previous slave node receiving an acknowledgment message to close a controllable switch connecting two portions of the data bus together (except that for the first acknowledgment message received, the master node closes its own switch).

In an alternative embodiment, after all of the switches 712 have been opened at each of the master node 703 and slave nodes 705, the master node 703 may emit a broadcast signal over the bus 704 instructing each of the slave nodes 705 to open its switch 712. The slave node 705 nearest the short circuit 722 will not receive the message and therefore will remain isolated. However, in this alternative embodiment the precise location of the fault is not determined.

Figure 11A:
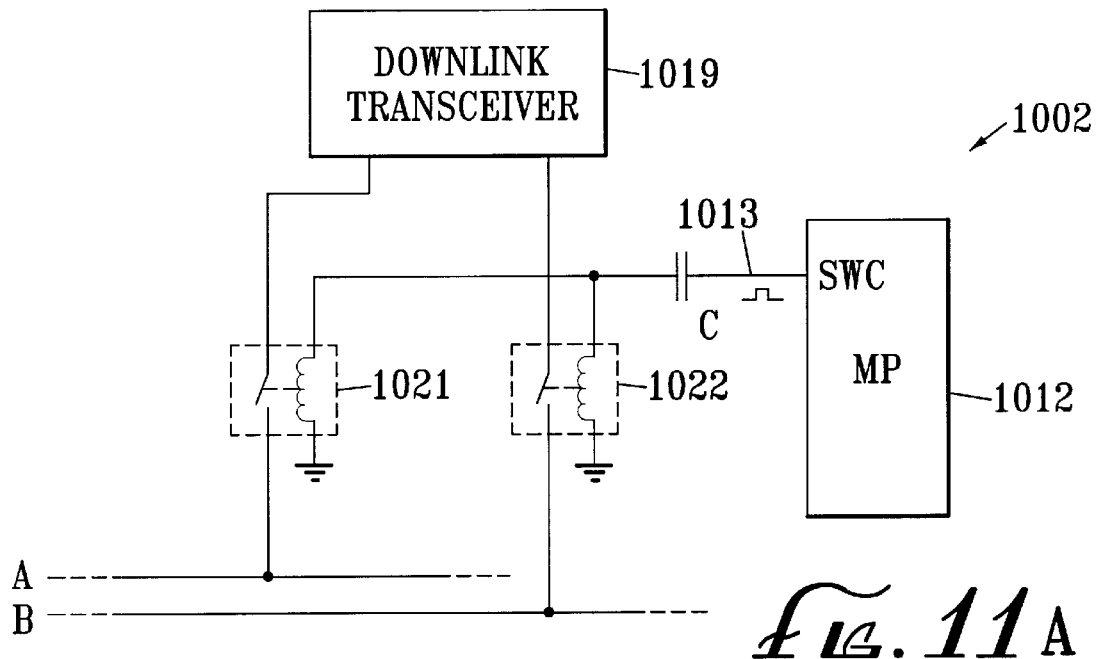
FIGS. 11A and 11B are block diagrams of fail-safe circuits for causing a set of relays to open upon failure of a microprocessor.
Figure 11B:
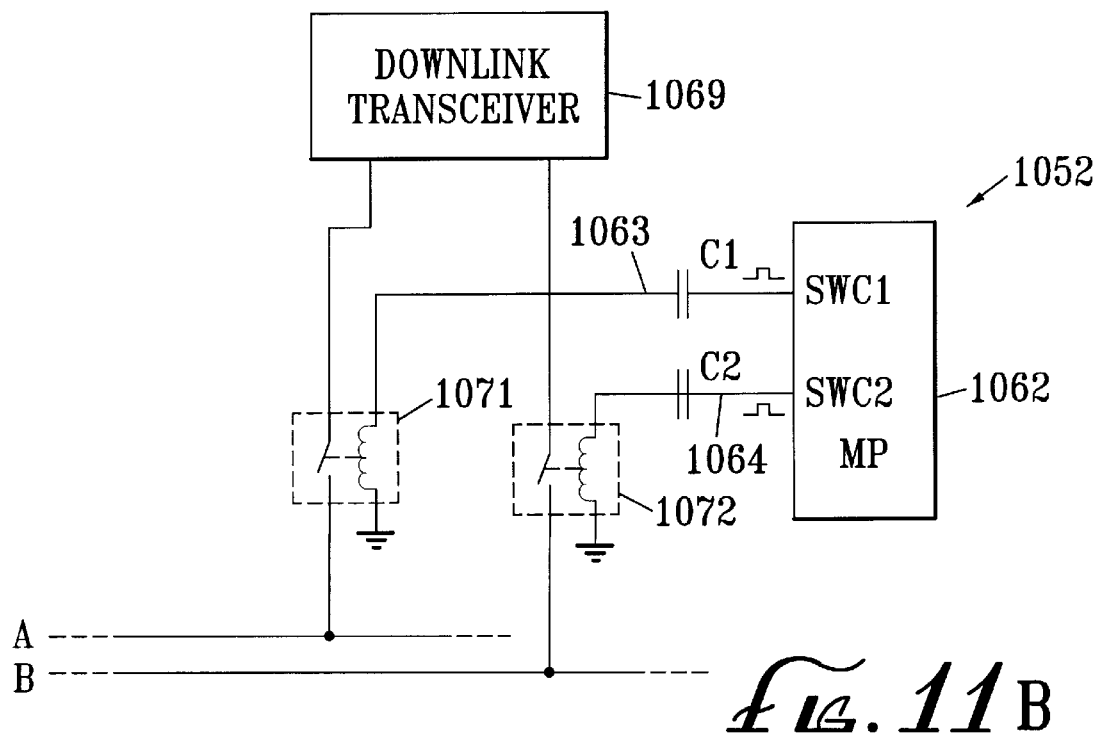

In another aspect of the invention, a fail-safe relay control circuit is provided whereby a node failure will result in most instances in the node being disconnected from the data bus without causing further harm to the system by, for example, contending for control or otherwise interfering with use of the data bus. FIGS. 11A and 11B show two alternative embodiments of a fail-safe relay control circuit in accordance with one or more aspects of the present invention. In FIG. 11A, a microprocessor 1012 is connected to relays 1021 and 1022 through relay control line 1013. Wires A and B of a bus (such as data bus 604 shown in FIG. 6) are connected to relays 1021 and 1022, respectively. When relays 1021 and 1022 are closed, a downlink transceiver 1019 is connected to wires A and B of a data bus. When relays 1021 and 1022 are open, the downlink transceiver 1019 is isolated from wires A and B of the data bus.

The open or closed state of relays 1021 and 1022 is controlled in FIG. 11A by relay control line 1013 connected to the microprocessor 1012. During time periods when relays 1021 and 1022 are to be open, the microprocessor 1012 holds relay control signal 1013 in a steady state (e.g., low). During time periods when relays 1021 and 1022 are to be closed, the microprocessor 1012 generates an periodic signal over relay control line 1013, which charges a capacitor C located along relay control line 1013 in serial connection with relays 1021 and 1022. The discharging of capacitor C causes current to flow, allowing relays 1021 and 1022 to remain energized and therefore closed. Should the microprocessor 1012 fail, then relay control line 1013 will most likely be stuck in a steady state (either high, low or floating). This will cause capacitor C to eventually reach a steady state and, regardless of which state the relay control line 1013 was previously held, cause the relays 1021 and 1022 to become de-energized, thereby opening the relays 1021 and 1022 and decoupling the downlink transceiver 1019 from wires A and B of the data bus.

The periodic signal on relay control line 1013 may be generated by programming the microprocessor 1012 to perform a timed software loop. For example, where the relays 1021, 1022 are to be closed, the microprocessor 1012 may be programmed to enter a relay signal control subroutine each time a predetermined time interval elapses, as indicated by an interrupt or clock polling routine or other appropriate timing method. Each time the relay signal control subroutine is entered, the microprocessor toggles the state of the relay control signal 1013, thereby produced a 50% duty cycle waveform with a period determined by the predetermined time interval. The predetermined time interval should be selected so as to result in the generation of a periodic signal over relay control line 1013 having a frequency selected so as to allow capacitor C by its periodic discharging to maintain enough current through the relays 1021, 1022 such that they stay energized. The frequency selected therefore depends mainly on the capacitance of capacitor C and the impedances of the relays 1021, 1022.

Alternatively, a slightly more involved software timing loop may be programmed using the microprocessor 1012 so that a signal is generated having a duty cycle other than fifty percent. However, generation of a fifty percent duty cycle waveform is in most circumstances simpler to implement.

Should the microprocessor 1012 fail, it would in most circumstances be desirable to disconnect the microprocessor 1012 from the data bus. (As shown in FIG. 6, for example, it is assumed that the microprocessor 1012 shown in FIG. 11A is the microprocessor 622 controlling the downlink transceiver 621, in which case microprocessor 622 would be operating as the master node for the data bus 604.) Depending on the nature of the failure, the microprocessor 1012 would most likely stop running the software loop keeping the relays 1021, 1022 closed. In this event, relay control signal 1013 would become stuck in a steady state, or a floating state, causing capacitor C to eventually stop discharging and the relays 1021, 1022 to de-energize and open. Accordingly, the circuitry of FIG. 11A provides a fail-safe mechanism whereby the microprocessor 1012 essentially disconnects itself from the data bus upon a failure that causes the microprocessor 1012 to stop executing its programmed functions.

FIG. 11B shows an alternative fail-safe circuit having the same function as the circuit shown in FIG. 11A. In FIG. 11B, the microprocessor 1062 has separate relay control lines 1063 and 1064 connected to relays 1071 and 1072, respectively, through series capacitors C1 and C2, respectively. The microprocessor 1062 is programmed with a software timing loop in a similar manner to that described above for microprocessor 1012 in FIG. 11A, whereby the microprocessor 1062 generates periodic signals over relay control lines 1063 and 1064 to keep relays 1071 and 1072 energized and, therefore, closed. Should microprocessor 1062 fail, the relays 1071 and 1072 will become de-energized and open, disconnecting the microprocessor 1062 from the data bus.

The fail-safe relay control circuits shown in FIGS. 11A and 11B may be employed in the circuitry of the node 603 shown in FIG. 6. In particular, relay control signal 1013 in FIG. 11A or relay control signals 1063 and 1064 in FIG. 11B would correspond to signal 633 of node 603 in FIG. 6.

In a preferred embodiment, the master node 703 and slave nodes 705 are connected using a single cable connecting all of the nodes in a loop configuration. Details of a preferred wiring and connection technique and method are described in copending U.S. application Ser. No. 08/853,989 entitled "Wiring Method and Apparatus for Distributed Control Network," previously incorporated herein by reference.

It should be noted that for each of the embodiments described herein, there is no particular restriction on the data rate for the data buses of the control network. Communication may be carried out over each data bus at a rate which is suitable for the particular control application. Moreover, there is no particular requirement that the data buses be serial data buses. Rather, the data buses may be parallel data buses in situations, for example, where a high data bandwidth is required.

As far as physical housing, in some applications it is preferable that each of the nodes be housed in a rugged, potted case made of a suitable lightweight material such as aluminum that provides environmental protection and allows for heat dissipation, as previously described with respect to FIG. 4. In other control environments, other types of housings or physical encasements may be used.

While preferred embodiments are disclosed herein, many variations are possible which remain within the concept and scope of the invention. Such variations would become clear to one of ordinary skill in the art after inspection of the specification and drawings herein. The invention therefore is not to be restricted except within the spirit and scope of any appended claims.

What is claimed is:

1. A control network comprising:
    a common bus for bi-directional communication;
    a plurality of nodes communicatively connected to said common bus, said nodes comprising
        a master node, and
        a plurality of slave nodes connected to said master node in series connection such that each node is connected to two adjacent nodes, said nodes collectively forming a loop;
    a plurality of fault detection circuits, at least one fault detection circuit located at each node; and
    a plurality of shunt circuits, at least one shunt circuit located at each node, each shunt circuit comprising a controllable relay in parallel with an impedance element;
    wherein said shunt circuits divide said common bus into a plurality of bus segments, each bus segment connecting two adjacent nodes, and each shunt circuit connecting two adjacent bus segments; and
    wherein said controllable relay is disposed in a closed position when in a non-fault mode such that signals can propagate around said loop over said common bus, is opened at each node when the node's fault detection circuit detects a fault so that signals cannot propagate around the entirety of said loop over said common bus, and is re-closed by the node a predetermined amount of time later in dependence upon a relative location of the node with respect to the master node.

2. The control network of claim 1 wherein said fault detection circuit comprises a timer, and wherein a fault condition is declared when a redefined fault detection time period is timed out by said timer.

3. The control network of claim 2 wherein said timer is reset periodically upon the detection of communication signals received at the node.

4. The control network of claim 1 wherein said impedance element at a given node comprises a resistance value selected such that communication signals from said master node will propagate through no more than one impedance element when said relay at each node is opened after detection of said fault.

5. The control network of claim 1 wherein said controllable relay is re-closed upon receipt by the node of an instruction from the master node.

6. In a control network comprising a plurality of nodes connected in a loop and communicating over a continuous bidirectional common bus, at least one of said nodes being designated as a master node and one or more of said nodes being slave nodes, a method comprising the steps of:
    (a) detecting a fault condition;
    (b) isolating each node from its adjacent nodes except for an impedance between each node and its adjacent nodes by breaking said common bus into a plurality of bus segments, such that a separate bus segment connects each pair of adjacent nodes;

(c) transmitting over said common bus a de-isolate control message from the master node to the nearest isolated slave node with respect to the master node;

(d) receiving the de-isolate control message at said nearest isolated slave node unless the fault condition prevents receipt of the de-isolate control message;

(e) de-isolating said nearest isolated slave node in response to receiving said de-isolate control message at said nearest isolated slave node, thereby causing the nearest isolated slave node to become de-isolated;

(f) sending over said common bus a de-isolation acknowledgment message from said de-isolated slave node to said master node; and (g) repeating steps (c) through (f) until a nearest isolated slave node fails to receive the de-isolate control message due to the fault condition.

7. The method of claim 6 wherein step (a) comprises the step of detecting the fault condition separately at each node.

8. The method of claim 6 wherein step (a) comprises the step of generating a fault detection signal individually at each node upon the timing out of a local watchdog timer.

9. The method of claim 6 wherein step (b) comprises the step of opening a relay at each node, each relay separating a pair of adjacent bus segments.

10. The method of claim 9 wherein step (e) comprises the step of closing the relay at the nearest isolated slave node in response to receiving said de-isolate control message from the master node, thereby re-connecting said pair of adjacent bus segments.

11. The method of claim 6 wherein step (g) comprises the steps of repeating steps (c) through (f) in one direction of the loop until a nearest isolated slave node in the one direction of the loop fails to receive the acknowledge receipt of the fault test message due to the fault condition, and repeating steps (c) through (f) in the other direction of the loop until a nearest isolated slave node in that direction of the loop fails acknowledge receipt of the fault test message due to the fault condition.

12. A control network comprising:

a common bus for bi-directional communication;

a plurality of nodes communicatively connected to said common bus, said nodes comprising
a master node, and
a plurality of slave nodes connected to said master node in series connection such that each node is connected to two adjacent nodes and each pair of adjacent nodes is connected across one of a plurality of bus segments of said common bus, said nodes collectively forming a loop;

a plurality of fault detection circuits, at least one fault detection circuit at each node; and a plurality of isolation circuits, at least one isolation circuit located at each node, each isolation circuit allowing signals to pass unimpeded across said common bus when in a non-fault mode impeding signals across said common bus by impeding signals between two adjacent bus segments connected to said node upon detection of a fault by said fault detection circuit, and resuming unimpeded passage of signals across said common bus after receiving a de-isolation instruction from the master node over said common bus;

wherein the master node transmits de-isolation instructions sequentially to each slave node over said common bus to determine the location of said fault.

13. The control network of claim 12, wherein said isolation circuit comprises a relay in parallel circuit connection with an impedance element.

14. The control network of claim 13 wherein said relay is disposed in a closed position when in a non-fault mode such that signals can pass unimpeded between the two adjacent bus segments connected to said node, is opened when said fault is detected thereby causing the impedance element to impede signals between said two adjacent bus segments, and is re-closed a predetermined amount of time after being opened in response to said de-isolation instruction being received from the master node.

15. The control network of claim 12 wherein said fault detection circuit comprises a timer, and wherein a fault condition is declared when a predefined fault detection time period is timed out by said timer.

16. The control network of claim 15 wherein said timer is reset periodically upon the detection of communication signals received at the node.

17. In a control network comprising a plurality of nodes connected in a loop such that a portion of a continuous, bi-directional common bus connecting the nodes passes through each node, and wherein at least one of said nodes operates as a master node and one or more of said nodes operate as slave nodes, a method comprising the steps of:

(a) detecting a fault individually at each node;

(b) in response to said fault, increasing an impedance at each node of the portion of the bus passing through the node so that signals cannot freely propagate around the entirety of said loop;

(c) transmitting a control message from the master node over said common bus to a slave node adjacent to the master node;

(d) receiving the control message at said nearest slave node unless the fault condition prevents receipt of the control message;

(e) decreasing the impedance at said nearest slave node in response to receiving said control message at said nearest slave node;

(f) sending a response message from said nearest slave node over said common bus to said master node; and (g) repeating steps (c) through (f) for each slave node in series until a slave node fails to receive the control message due to the fault condition.

18. The method of claim 17 wherein the step of increasing the impedance at each node of the portion of the bus passing through the node comprises the step of opening a switch at each node and causing each portion of the bus to be linked to the next bus portion by a resistor at each node shunting the switch.

19. The method of claim 17 comprising the step of repeating steps (c) through (f) for each slave node in the opposite direction from the adjacent slave node, except in step (f) that the impedance is decreased at the previous node instead of the newest slave node.

20. The method of claim 17 wherein the step of detecting said fault individually at each node comprises the steps of:

monitoring at each node communication signals carried over the bus;
timing out a fault detection period at each node;
resetting the fault detection period at a node when a communication signal is detected at the node; and
asserting a fault detection condition when the fault detection period times out.

21. The method of claim 20 further comprising the steps of:

timing a master failure detection period at a slave node;
internally resetting the master failure detection period at the slave node when a communication signal is detected at the node;

asserting a master node failure condition when the master failure detection period times out; and substituting the slave node for the master node in response to the assertion of the master node failure condition.

22. The control network of claim 1, wherein each node comprises a transceiver, said transceiver connected to the shunt circuit at the node by a second impedance element.

23. The control network of claim 1, wherein each slave node is configured to take over as the acting master node a predetermined time period after detection of said fault, said predetermined time period unique to each slave node.

24. The method of claim 10, wherein step (b) further comprises the step of separating each pair of adjacent bus segments by an impedance element.

25. The method of claim 24, further comprising the step of connecting in parallel each relay and each impedance element separating the same pair of bus segments, and further comprising the step of connecting a second impedance element between (i) the relay and impedance element separating at a given juncture between two bus segments, and (ii) a node connecting to said juncture through said second impedance element.

26. The method of claim 6, further comprising the step of substituting one of said slave nodes as acting master node in the event that none of the slave nodes receives said de-isolate control message from the master node within a predetermined time period after detection of said fault condition.

27. The control network of claim 12, wherein each slave node is configured to take over as the acting master node a predetermined time period after detection of said fault, said predetermined time period unique to each slave node.

28. The control network of claim 13, wherein each node comprises a transceiver, said transceiver connected to the isolation circuit at the node by a second impedance element.

29. The method of claim 17, further comprising the step of substituting one of said slave nodes as acting master node in the event that none of the slave nodes receives said control message from the master node within a predetermined time period after detection of said fault.

30. The method of claim 18, further comprising the step of connecting, at each node, a second resistor between a transceiver in the node and a common terminal of said first resistor and said switch.

31. A control network, comprising:

a plurality of nodes, said nodes comprising a master node and a plurality of slave nodes; and a bi-directional common bus, said nodes connected to said bi-directional common bus in a loop configuration;

wherein each node comprises a shunt circuit and a transceiver connected to said shunt circuit through a first impedance element;

wherein said shunt circuit comprises a controllable switch in parallel with a second impedance element, said shunt circuit at each node connecting together two adjacent segments of said bidirectional common bus;

wherein each node maintains the switch at its respective shunt circuit closed when in a non-fault mode, thereby allowing free propagation of communication signals around said bidirectional common bus;

wherein each node opens the switch at its respective shunt circuit in response to detection of a fault condition, thereby connecting each pair of adjacent segments of said bi-directional common bus together by said second impedance element of said node; and wherein, in response to said fault condition, the master node sequentially instructs the slave nodes to close the switch of each slave node's respective shunt circuit.

32. The control network of claim 31, wherein said fault condition comprises the failure to detect expected communication signals within a predetermined fault detection time period.

33. The control network of claim 31, wherein a fault location is detected when the master node fails to receive an acknowledgment from one of the slave nodes in response to the master node's instruction to the slave node to close its switch.

34. The control network of claim 31, wherein one of slave nodes takes over as the acting master node upon the failure of any slave node to receive an instruction to close its switch after detection of said fault condition.

* * * * *

UNITED STATES PATENT AND TRADEMARK OFFICE
CERTIFICATE OF CORRECTION

PATENT NO.    : 6,147,967
DATED         : November 14, 2000
INVENTOR(S)   : Jeffrey Ying It is certified that error appears in the above-identified patent and that said Letters Patent is hereby corrected as shown below:

Column 5,
Line 57, after "node 301" delete "is".

Column 6,
Line 28, after "fails" insert -- , --.
Line 46, after "controller 23" insert -- and --.
Line 47, after "come to" insert -- a --.

Column 8,
Line 49, before "targeted" delete "used".

Column 9,
Line 32, after "slave nodes" delete "are".
Line 64, after "response" delete "is" and insert -- are --.

Column 12,
Line 26, "elapses" should be -- elapse --.
Line 29, "elapses" should be -- elapse --.
Line 31, "elapses" should be -- elapse --.

Column 13,
Line 31, before "operate" insert -- to --.

Column 14,
Line 44, after "node 705" delete "is" and insert -- are --.
Line 48, "slave nodes 703" should be -- slave nodes 705 --.
Line 52, "monitor" should be -- monitors --.
Line 58, after "similar to" insert -- that --.

Column 15,
Line 2, after "slave nodes 705" delete "are" and insert -- is --.

Column 16,
Line 30, delete the second occurrence of "to allow the".

UNITED STATES PATENT AND TRADEMARK OFFICE
CERTIFICATE OF CORRECTION

PATENT NO.    : 6,147,967
DATED         : November 14, 2000
INVENTOR(S)   : Jeffrey Ying It is certified that error appears in the above-identified patent and that said Letters Patent is hereby corrected as shown below:

Column 17,
Line 38, "slave nodes" should be -- slave node --.
Line 53, "master node 704" should be -- master node 703 --
Line 62, "705$b$" delete "node".

Column 20,
Line 40, before "periodic" delete "an" and insert -- a --.
Line 49 after "regardless of" insert -- in --.
Line 63, "produced" should be -- producing --.

Column 21,
Line 53, "after "U.S." delete "application Ser. No. 08/853,989" and insert -- Patent 5,907,486 --.

Column 22,
Line 43, "redefined" should be -- predefined --.

Column 23,
Line 25, "claim 9" should be -- claim 6 --.
Line 55, after "mode" insert -- , --.

Signed and Sealed this

Thirteenth Day of August, 2002

Attest:

JAMES E. ROGAN
Attesting Officer    Director of the United States Patent and Trademark Office